US012095154B2

(12) United States Patent
Chiang

(10) Patent No.: US 12,095,154 B2
(45) Date of Patent: Sep. 17, 2024

(54) ANTENNA STRUCTURE

(71) Applicant: AUDEN TECHNO CORP., Taoyuan (TW)

(72) Inventor: Chi-Ming Chiang, Taoyuan (TW)

(73) Assignee: AUDEN TECHNO CORP., Taoyuan (TW)

( * ) Notice: Subject to any disclaimer, the term of this patent is extended or adjusted under 35 U.S.C. 154(b) by 95 days.

(21) Appl. No.: 17/985,665

(22) Filed: Nov. 11, 2022

(65) Prior Publication Data

US 2023/0198136 A1 Jun. 22, 2023

(30) Foreign Application Priority Data

Dec. 17, 2021 (TW) ................................ 110147312

(51) Int. Cl.
*H01Q 1/38* (2006.01)
*H01Q 9/04* (2006.01)
*H01Q 25/00* (2006.01)

(52) U.S. Cl.
CPC ............ *H01Q 1/38* (2013.01); *H01Q 25/001* (2013.01)

(58) Field of Classification Search
CPC ..... H01Q 25/00; H01Q 25/001; H01Q 9/0435
See application file for complete search history.

(56) References Cited

FOREIGN PATENT DOCUMENTS

TW M388739 U1 9/2010

*Primary Examiner* — Hoang V Nguyen
(74) *Attorney, Agent, or Firm* — Li & Cai Intellectual Property (USA) Office

(57) ABSTRACT

An antenna structure is provided. The antenna structure includes an insulating seat, a first antenna and a second antenna disposed on the insulating seat, and two feeding points electrically coupled to the first antenna and the second antenna. The first antenna includes a first body portion and a plurality of first extending portions non-parallel to the first body portion. The second antenna includes a second body portion and a plurality of second extending portions. The second body portion is spaced apart from the first body portion and non-parallel to each of the second extending portions. A length of one of the second extending portion adjacent to a diagonal line of the second body portion is less than a length of another one of the second extending portions. The second extending portions and the first extending portions are spaced apart from each other and jointly generate a capacitance effect.

9 Claims, 21 Drawing Sheets

ANTENNA STRUCTURE

CROSS-REFERENCE TO RELATED PATENT APPLICATION

This application claims the benefit of priority to Taiwan Patent Application No. 110147312, filed on Dec. 17, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna structure, and more particularly to an antenna structure that is three-dimensional.

BACKGROUND OF THE DISCLOSURE

Conventional antenna structures are designed as planar sheet-like structures. However, when the conventional antenna structures are disposed on an element (e.g., a substrate in a mobile phone), the conventional antenna structures will occupy a considerable area on the element, so that a volume of a final product cannot be reduced. For example, when a side length of a conventional antenna structure is designed to be ½λ and is applied to ultra-high frequency radio frequency identification (i.e., UHF RFID), a side length of the conventional antenna structure having a frequency band within a range from 902 MHz to 928 MHz is bound to be greater than 16 cm.

SUMMARY OF THE DISCLOSURE

In response to the above-referenced technical inadequacy, the present disclosure provides an antenna structure.

In one aspect, the present disclosure provides an antenna structure. The antenna structure includes an insulating seat, a first antenna, a second antenna, and two feeding points. The first antenna is disposed on the insulating seat, and the first antenna includes a first body portion and a plurality of first extending portions. The first body portion has four side edges. The first extending portions are connected to the four side edges of the first body portion, and each of the plurality of first extending portions is non-parallel to the first body portion. The second antenna is disposed on the insulating seat, and the second antenna includes a second body portion and a plurality of second extending portions. The second body portion is spaced apart from the first body portion and has four side edges. The second body portion has four side edges and a diagonal line, and the diagonal line passes through a junction position of two of the four side edges and a junction position of another two of the four side edges. The second extending portions are non-parallel to the second body portion. Each of the four side edges of the second body portion is connected to at least two of the second extending portions, and the second extending portions and the first extending portions are spaced apart from each other by a predetermined distance, so that the second extending portions and the first extending portions are configured to jointly generate a capacitance effect. In each of the four side edges of the second body portion, a length of a second extending portion adjacent to the diagonal line is less than a length of any one of the second extending portions. The two feeding points are electrically coupled to the first antenna and the second antenna.

In another aspect, the present disclosure provides an antenna structure. The antenna structure includes an insulating seat, a first antenna, a second antenna, an insulating plate, a microstrip line, and two feeding points. The first antenna is disposed on the insulating seat, and the first antenna includes a first body portion, and a plurality of first extending portions. The first body portion has four side edges. The first extending portions are connected to the four side edges of the first body portion. Each of the plurality of first extending portions is non-parallel to the first body portion. The second antenna is disposed on the insulating seat, and the second antenna includes a second body portion and a plurality of second extending portions. The second body portion is spaced apart from the first body portion and has four side edges. The second extending portions are connected to the four side edges of the second body portion and non-parallel to the second body portion. The second extending portions and the first extending portions are spaced apart from each other by a predetermined distance, so that the second extending portions and the first extending portions are configured to jointly generate a capacitance effect. The insulating plate is disposed on the first antenna. The microstrip line is disposed on the insulating plate. The microstrip line has two contact points electrically coupled to the first antenna and the second antenna, and a phase difference between the two contact points is 90 degrees. The two feeding points are electrically coupled to the microstrip line.

Therefore, in the antenna structure provided by the present disclosure, by virtue of each of the plurality of second extending portions being non-parallel to the second body portion and the second extending portions and the first extending portions being spaced apart from each other by a predetermined distance, such that the second extending portions and the first extending portions are configured to jointly generate a capacitance effect, the antenna structure can have a three-dimensional structure, and an area occupied by the antenna structure can be more effectively decreased than an area occupied by one having a planar structure and having a same gain.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
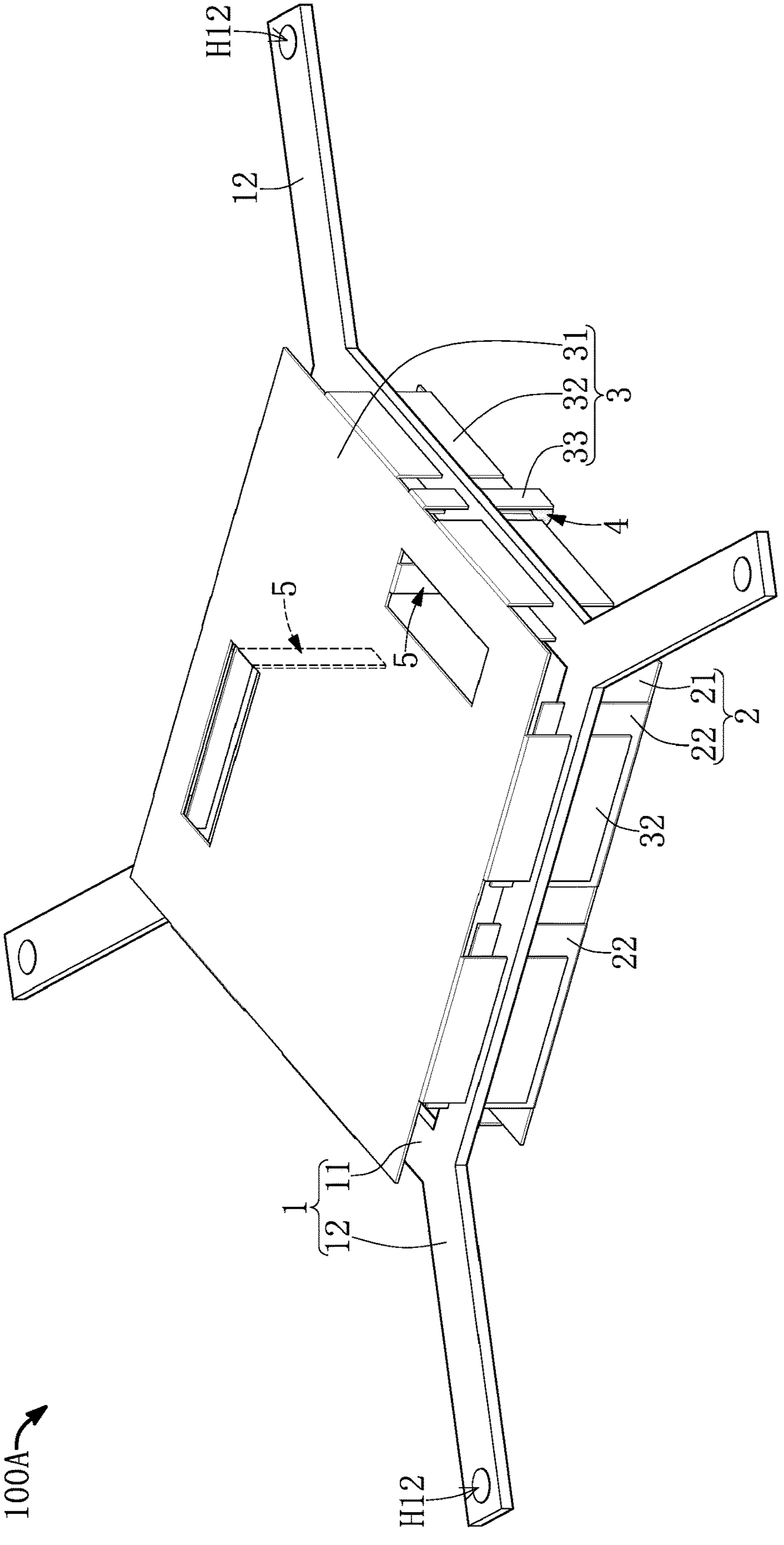
FIG. 1 is a schematic perspective view of an antenna structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 8, a first embodiment of the present disclosure provides an antenna structure 100A, and a polarization mode of the antenna structure 100A is linear polarization. In other words, any antenna structure that does not have a polarization mode being linear polarization is not the antenna structure 100A of the present disclosure.

Figure 2:
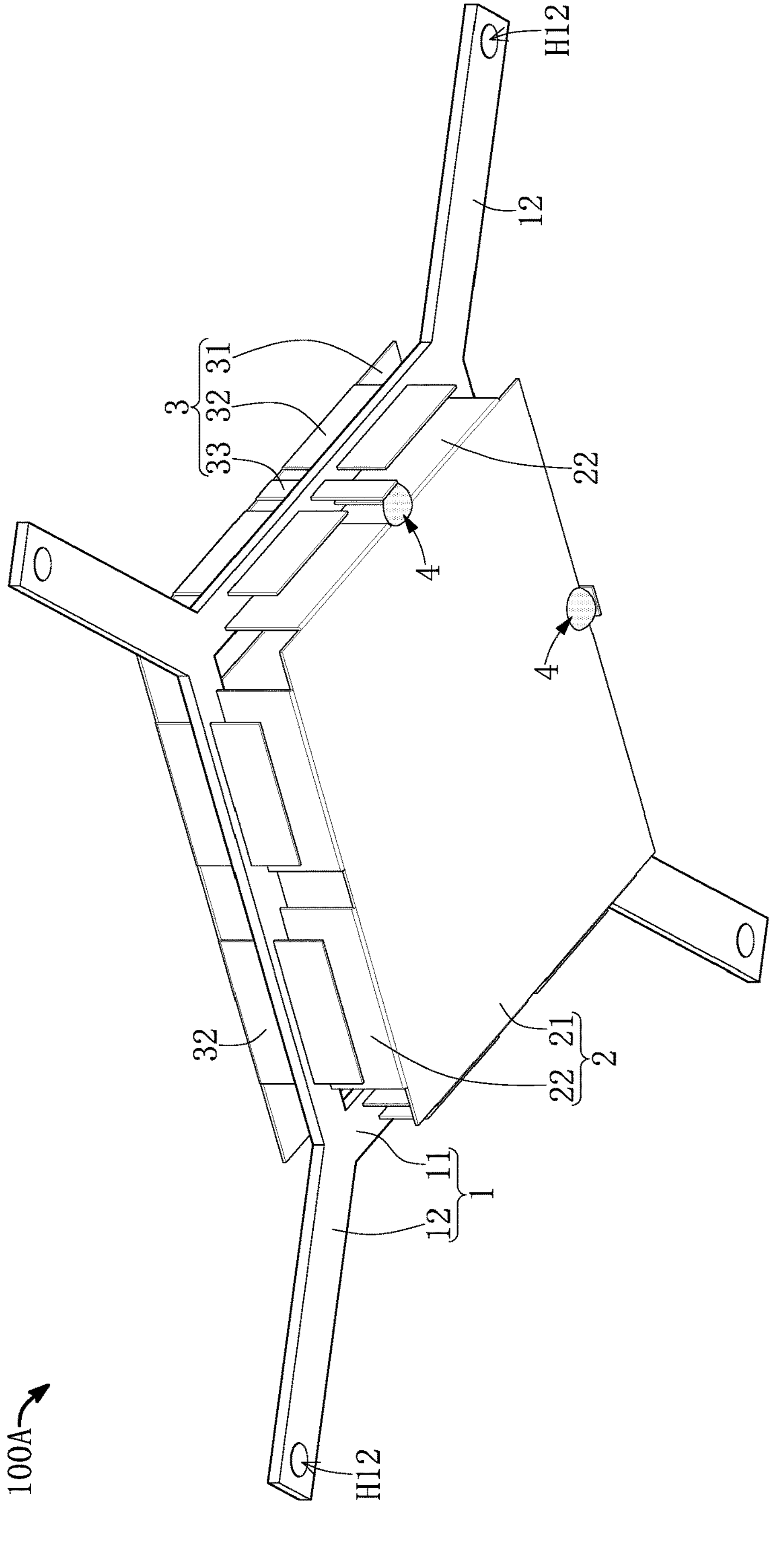
FIG. 2 is another schematic perspective view of the antenna structure according to the first embodiment of the present disclosure.

Referring to FIG. 1 and FIG. 2, the antenna structure 100A includes an insulating seat 1, a first antenna 2 and a second antenna 3 that are disposed on the insulating seat 1, and two feeding points 4 and two grounding elements 5 that are electrically coupled to the first antenna 1 and the second antenna 2.

Figure 3:
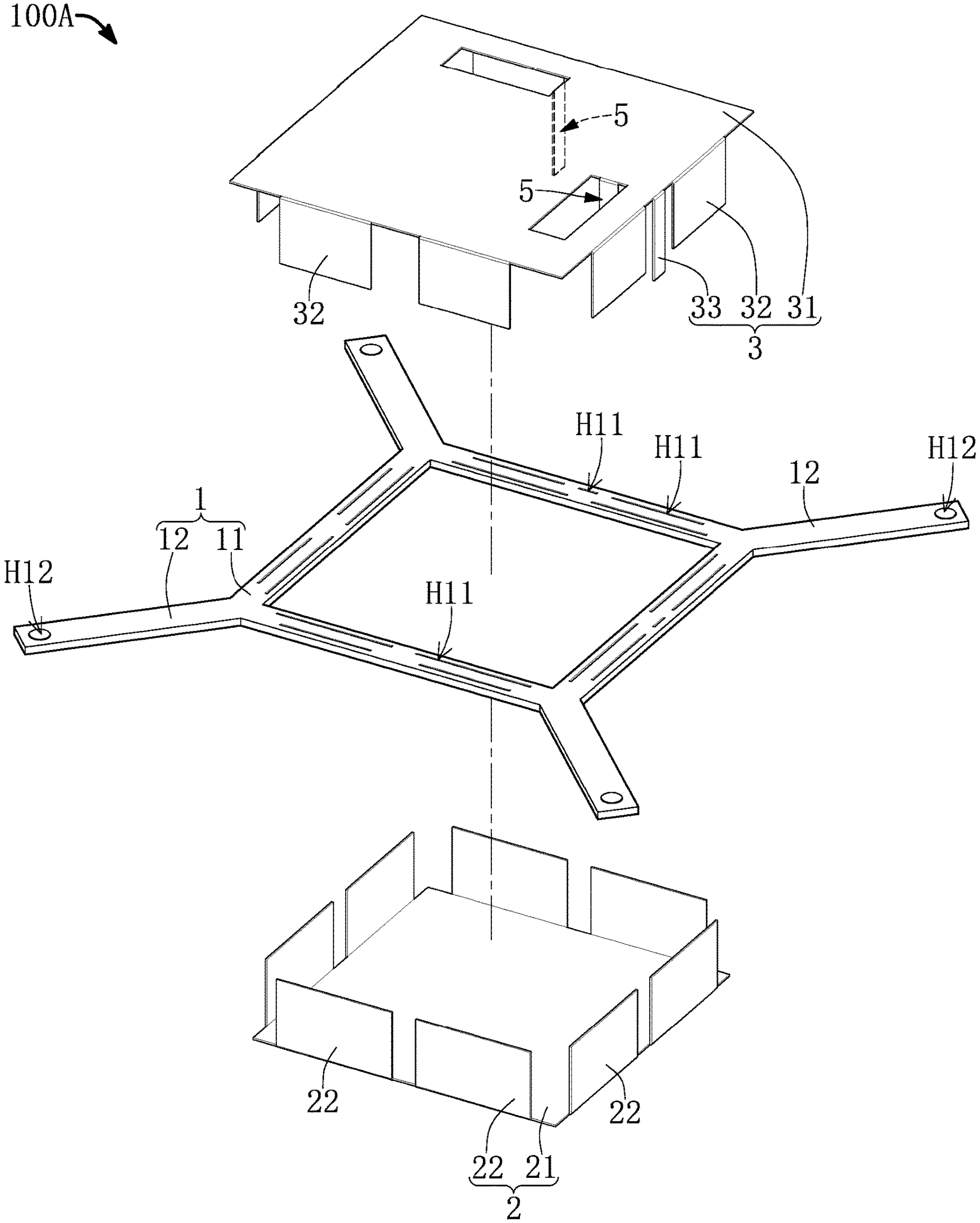
FIG. 3 is an exploded view of the antenna structure according to the first embodiment of the present disclosure.
Figure 4:
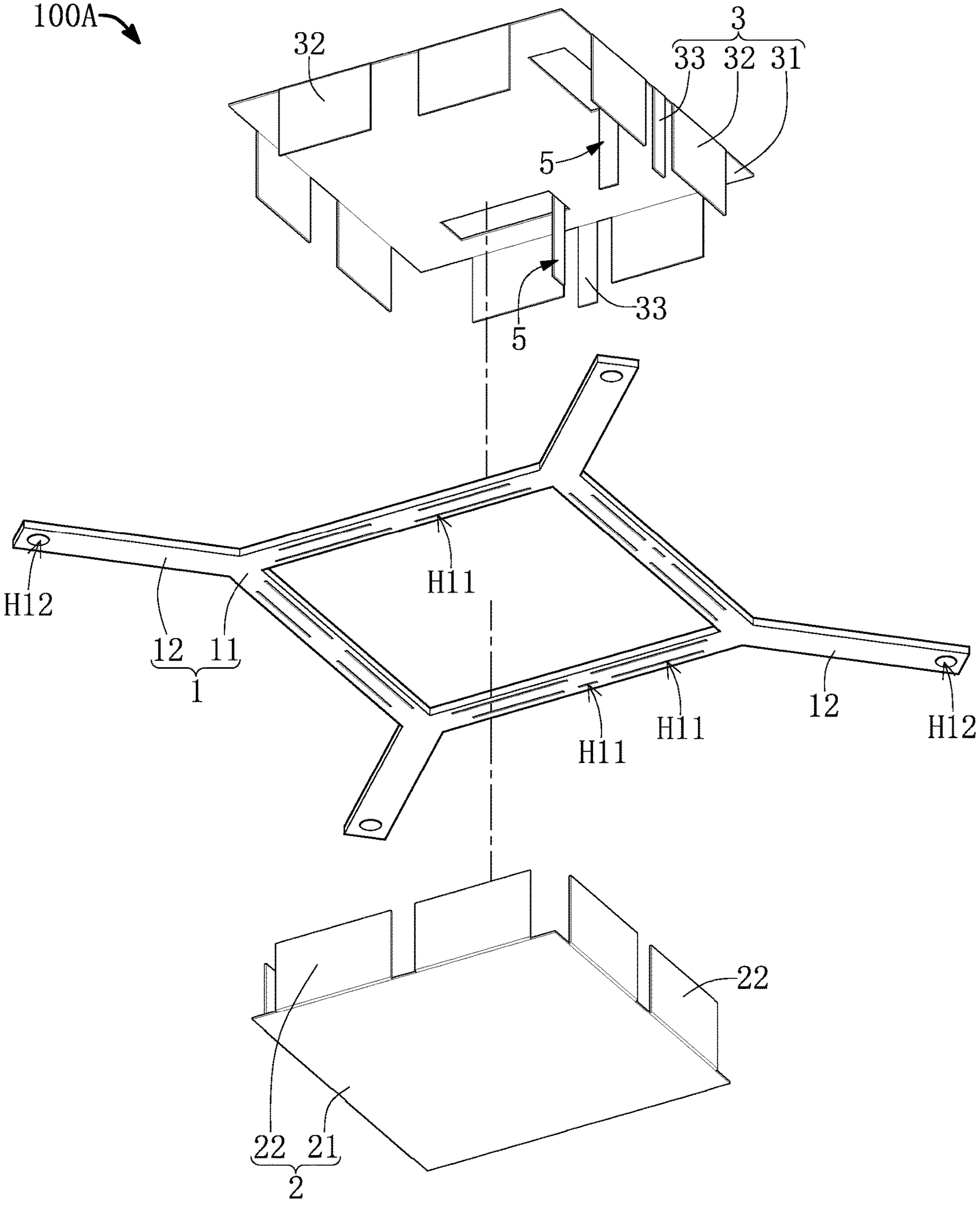
FIG. 4 is another exploded view of the antenna structure according to the first embodiment of the present disclosure.

Referring to FIG. 3 and FIG. 4, the insulating seat 1 in the present embodiment can be made of an insulating material, and has a frame body 11 and four fixing arms 12 that are connected to the frame body 11. In detail, the frame body 11 is in a rectangular shape and has a first side and a second side that is opposite to the first side. In the present embodiment, the first side is an upper side of the frame body 11 in FIG. 3, and the second side is a lower side of the frame body 11 in FIG. 3, but the present disclosure is not limited thereto.

The frame body 11 has a plurality of setting holes H11 in spatial communication with the first side and the second side, and the setting holes can be used for disposing the first antenna 2 and the second antenna 3.

The four fixing arms 12 are integrally formed by extending from four corners of the frame body 11, and each of the four fixing arms 12 has a fixing hole H12. The insulating seat 1 can be fastened on an electronic component (e.g., a base plate of a mobile phone) by using a plurality of fixed elements (e.g., screws) to pass through the fixing holes H12, but the insulating seat 1 of the present disclosure is not limited thereto. For example, in another embodiment of the present disclosure (not shown in the figures), the insulating seat 1 may omit the four fixing arms 12.

Referring to FIG. 2 and FIG. 3, the first antenna 2 in the present embodiment is made of a metal material, and includes a first body portion 21 and a plurality of first extending portions 22 that are connected to the first body portion 21. Then, elements of the first antenna 2 will be introduced in the following description.

The first body portion 21 in the present embodiment is a sheet-like structure that is in a square shape, and has four side edges. Each of the plurality of first extending portions 22 in the present embodiment is a sheet-like structure that is in a rectangular shape. The first extending portions 22 are connected to the four side edges of the first body portion 21, and are non-parallel to the first body portion 21. In practical use, the first extending portions 22 are integrally formed by extending from the four side edges of the first body portion 21, and each of the four side edges of the first body portion 21 has two of the first extending portions 22 that are spaced apart from each other. In other words, the first antenna 2 includes eight first extending portions 22.

Preferably, each of the plurality of first extending portions 22 may be perpendicular to the first body portion 21, and an area of each of the plurality of first extending portions 22 is less than or equal to 30% of an area of the first body portion 21, but the present disclosure is not limited thereto.

It should be noted that a quantity of the first extending portions 22 connected to each of the four side edges of the first body portion 21, and an angle between each of the plurality of first extending portions 22 and the first body portion 21 can be adjusted according to practical requirements. For example, each of the four side edges of the first body portion 21 may have one of the first extending portions 22 or three of the first extending portions 22 that are spaced apart from each other, and the angle between each of the plurality of first extending portions 22 and the first body portion 21 may be 120 degrees.

In addition, the first antenna 2 in practice can be disposed on the insulating seat 1 along a direction from the second side to the first side, so that the first extending portions 22 can pass through a part of the setting holes H11 of the frame body 11, and the first antenna 2 can be fixed on the insulating seat 1.

Referring to FIG. 1 and FIG. 4, the second antenna 3 in the present embodiment is made of a metal material, and includes a second body portion 31, and a plurality of second extending portions 32 and two connecting portions 33 that are connected to the second body portion 31. Then, elements of the second antenna 3 will be introduced in the following description.

The second body portion 31 in the present embodiment is a sheet-like structure that is in a square shape, and has four side edges. An area of the second body portion 31 can be not equal to the area of the first body portion 21. For example, the area of the second body portion 31 is greater than the area of the first body portion 21. Preferably, a difference between the area of the first body portion 21 and the area of the second body portion 31 is less than or equal to 5% of the area of the first body portion 21.

Figure 5:
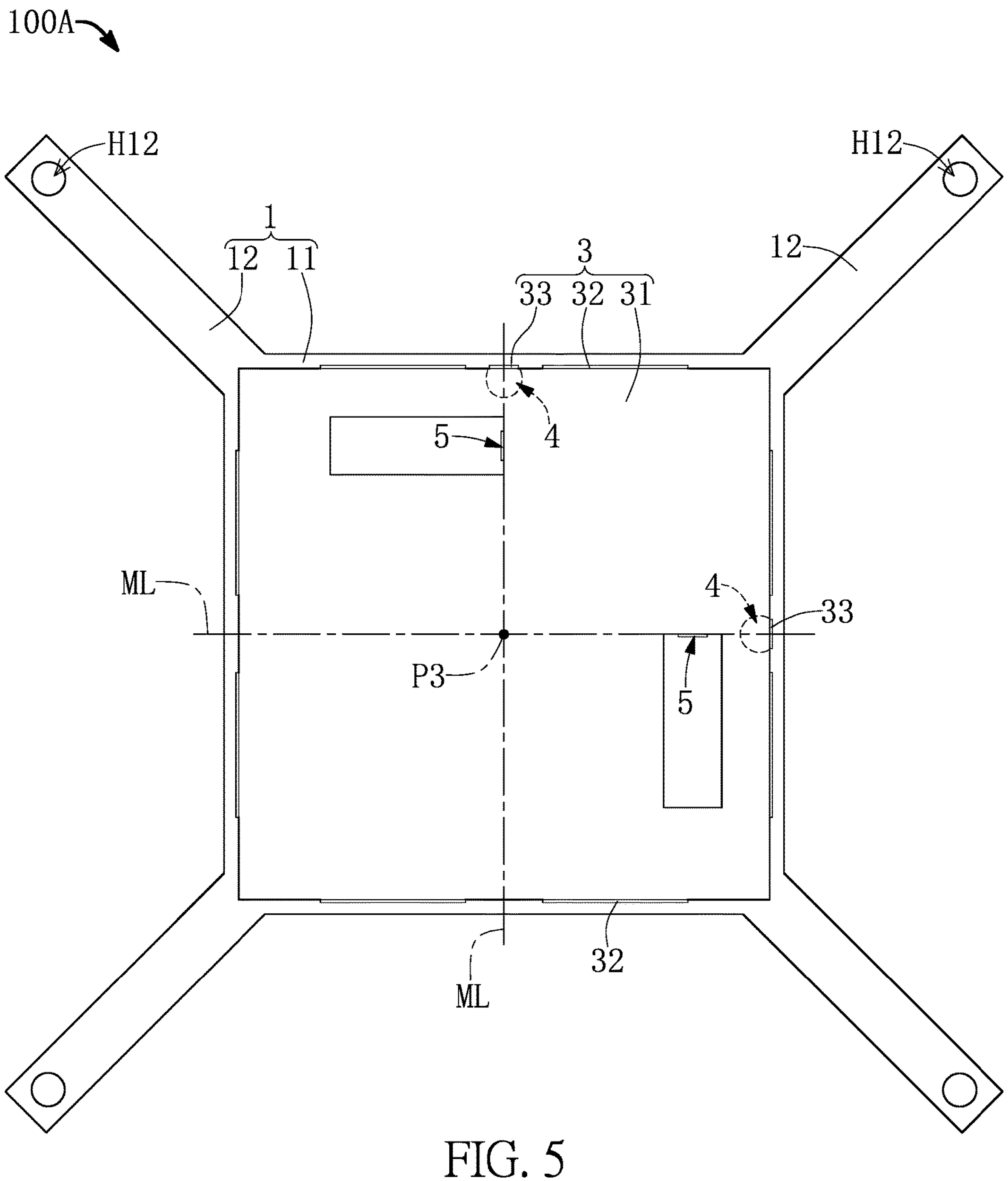
FIG. 5 is a schematic top view of the antenna structure according to the first embodiment of the present disclosure.
Figure 6:
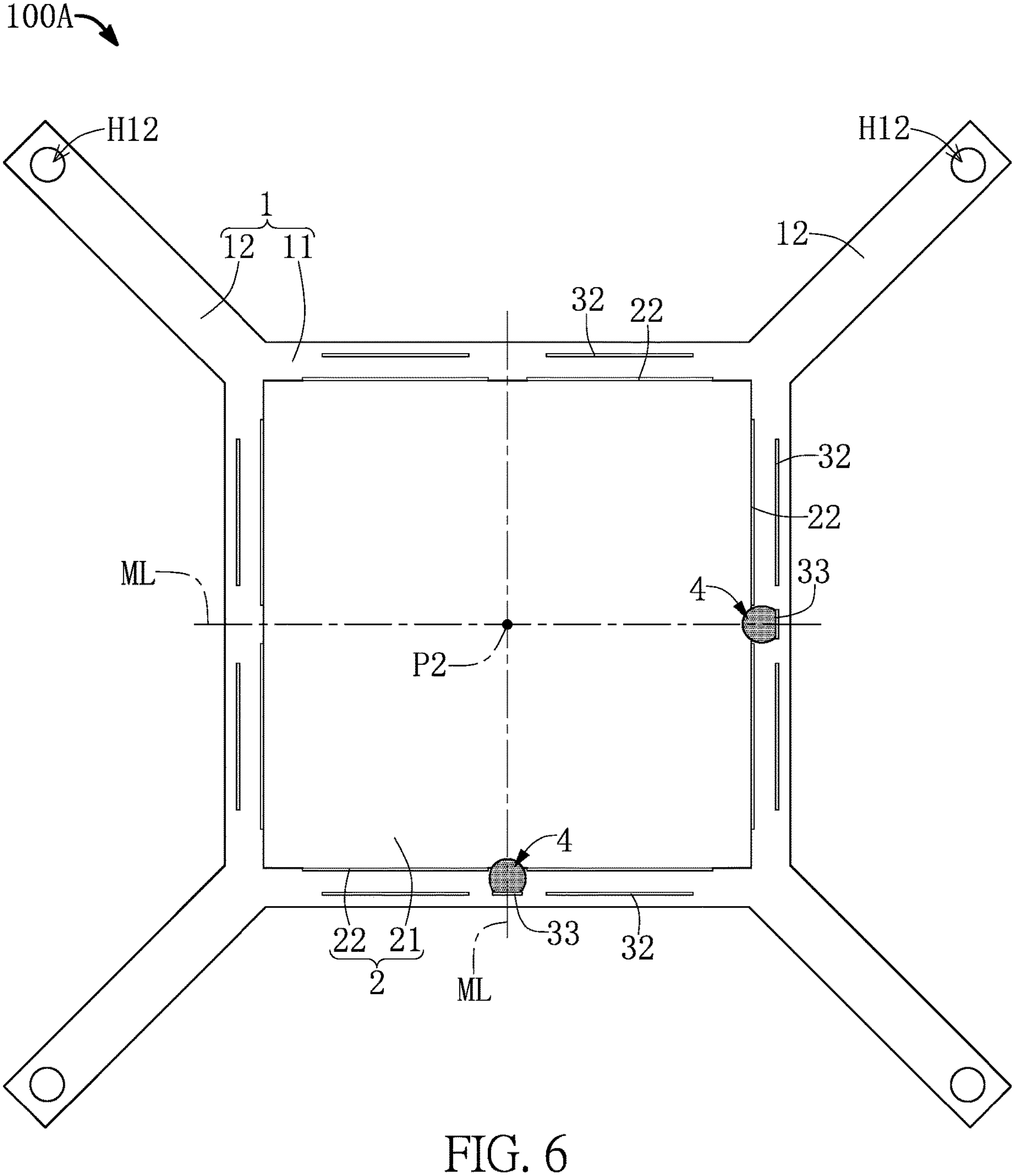
FIG. 6 is a schematic bottom view of the antenna structure according to the first embodiment of the present disclosure.

Referring to FIG. 5, the second body portion 31 has two centerlines ML, and the two centerlines ML pass through a center position P3 of the second body portion 31. The two centerlines ML are respectively parallel to two adjacent ones of the four side edges of the second body portion 31 (e.g., an upper side edge and a left side edge of the second body portion 31 in FIG. 5, or a lower side edge and a right side edge of the second body portion 31 in FIG. 5), so that the two centerlines ML are perpendicular to each other.

Referring to FIG. 4, each of the plurality of second extending portions 32 in the present embodiment is a sheet-like structure that is in a rectangular shape. The second extending portions 32 are connected to the four side edges of the second body portion 31, and are non-parallel to the second body portion 31. In practical use, the second extending portions 32 are integrally formed by extending from the four side edges of the second body portion 31, and each of the four side edges of the second body portion 31 has two of the second extending portions 32 that are spaced apart from each other. In other words, the second antenna 3 includes eight second extending portions 32.

Preferably, each of the plurality of second extending portions 32 may be perpendicular to the second body portion 31, and an area of each of the plurality of second extending portions 32 is less than or equal to 30% of the area of the second body portion 31. Moreover, the area of the second extending portions 32 in the present embodiment is less than the area of the first extending portions 22, but the present disclosure is not limited thereto.

It should be noted that a quantity of the second extending portions 32 connected to each of the four side edges of the second body portion 31, and an angle between each of the plurality of second extending portions 32 and the second body portion 31 can be adjusted according to practical requirements. For example, each of the four side edges of the second body portion 31 may have one of the second extending portions 32 or three of the second extending portions 32 that are spaced apart from each other, and the angle between each of the plurality of second extending portions 32 and the second body portion 31 may be 120 degrees.

In addition, the second antenna 3 in practice can be disposed on the insulating seat 1 along a direction from the first side to the second side, so that the second extending portions 32 can pass through another part of the setting holes H11 of the frame body 11, and the second antenna 3 can be fixed on the insulating seat 1.

In other words, when the first antenna 2 and the second antenna 3 are disposed on the insulating seat 1, the first body portion 21 is located on the second side of the frame body 11 and the second body portion 31 is located on the first side of the frame body 11, and the first body portion 21 and the second body portion 31 are parallel to each other, but the present disclosure is not limited thereto.

In addition, as shown in FIG. 1 and FIG. 2, when the first antenna 2 and the second antenna 3 are disposed on the insulating seat 1, the first extending portions 22 extend from the first body portion 21 toward the second body portion 31 and the second extending portions 32 extend from the second body portion 31 toward the first body portion 21, and the first extending portions 22 correspond in position to the second extending portions 32. Accordingly, the first antenna 2 and the second antenna 3 can be formed into a three-dimensional structure that is substantially a cuboid.

It should be noted that, in other embodiments of the present disclosure (not shown in the figures), the quantity of the first extending portions 22 of the first antenna 2 and the quantity of the second extending portions 32 of the second antenna 3 may also be inconsistent, that is, the first extending portions 22 do not correspond in position to the second extending portions 32, respectively. For example, the quantity of the first extending portions 22 of the first antenna 2 is four, the quantity of the second extending portions 32 of the second antenna 3 is twelve, and each of the plurality of first extending portions 22 corresponds in position to three of the second extending portions 32.

Referring to FIG. 1, FIG. 4, and FIG. 5, each of the two connecting portions 33 in the present embodiment is a sheet-like structure that is in a rectangular shape. The two connecting portions 33 are respectively located on two adjacent ones of the four side edges of the second body portion 31 (e.g., an upper side edge and a right side edge of the second body portion 31 in FIG. 5), and each of the two connecting portions 33 is located between two of the second extending portions 32 on a corresponding one of the four side edges of the second body portion 31. The two connecting portions 33 respectively pass through the two centerlines ML, that is, an angle between a line connected to one of the two connecting portions 33 and the center position P3 of the second body portion 31 and a line connected to another of the two connecting portions 33 and the center position P3 is 90 degrees.

In addition, the two connecting portions 33 in the present embodiment are formed by extending from the second body portion 31 toward the first body portion 21. The two connecting portions 33 are perpendicular to the second body portion 31 and pass through the frame body 11, so as to connect to the first body portion 21. Accordingly, the two connecting portions 33 can be electrically coupled to the first body portion 21, and two connecting points between the two connecting portions 33 and the first body portion 21 can be defined as the two feeding points 4. In practice, the two connecting portions 33 may be connected or electrically coupled to the first body portion 21 by soldering, respectively.

It is worth noting that, two paths of projections defined by orthogonally projecting the two feeding points 4 on (an extension plane of) the second body portion 31 respectively pass through the two centerlines ML (as shown in FIG. 5).

Referring to FIG. 1 and FIG. 5, the two grounding elements 5 are connected to the first body portion 21 and the second body portion 32. Two paths of projections defined by orthogonally projecting the two grounding elements 5 on the second body portion 31 respectively pass through the two centerlines ML, so that one of the first body portion 21 and the second body portion 32 can be used as a grounding component, and another one of the first body portion 21 and the second body portion 32 can be used as a radiating component. Accordingly, a size of the grounding component and a size of the radiating component can be similar (that is, the difference between the area of the first body portion 21 and the area of the second body portion 31 is less than or equal to 5% of the area of the first body portion 21). The two grounding elements 5 are integrally formed by extending from the second body portion 31 toward the first body portion 21, but the present disclosure is not limited thereto. For example, the two grounding elements 5 may also be integrally formed by extending from the first body portion 21 toward the second body portion 31.

Figure 7:
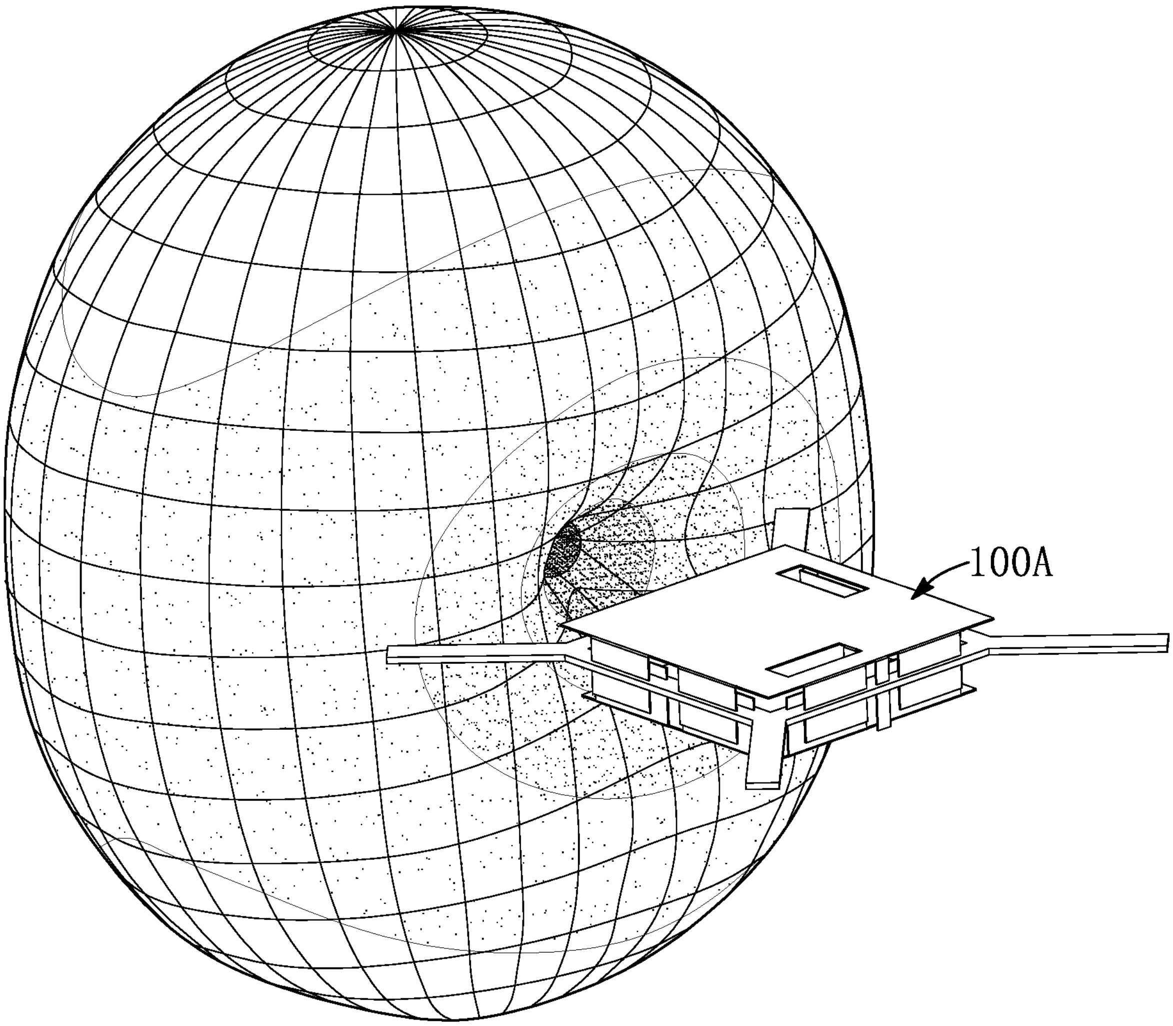
FIG. 7 is a schematic diagram of a radiation pattern of the antenna structure according to the first embodiment of the present disclosure.
Figure 8:
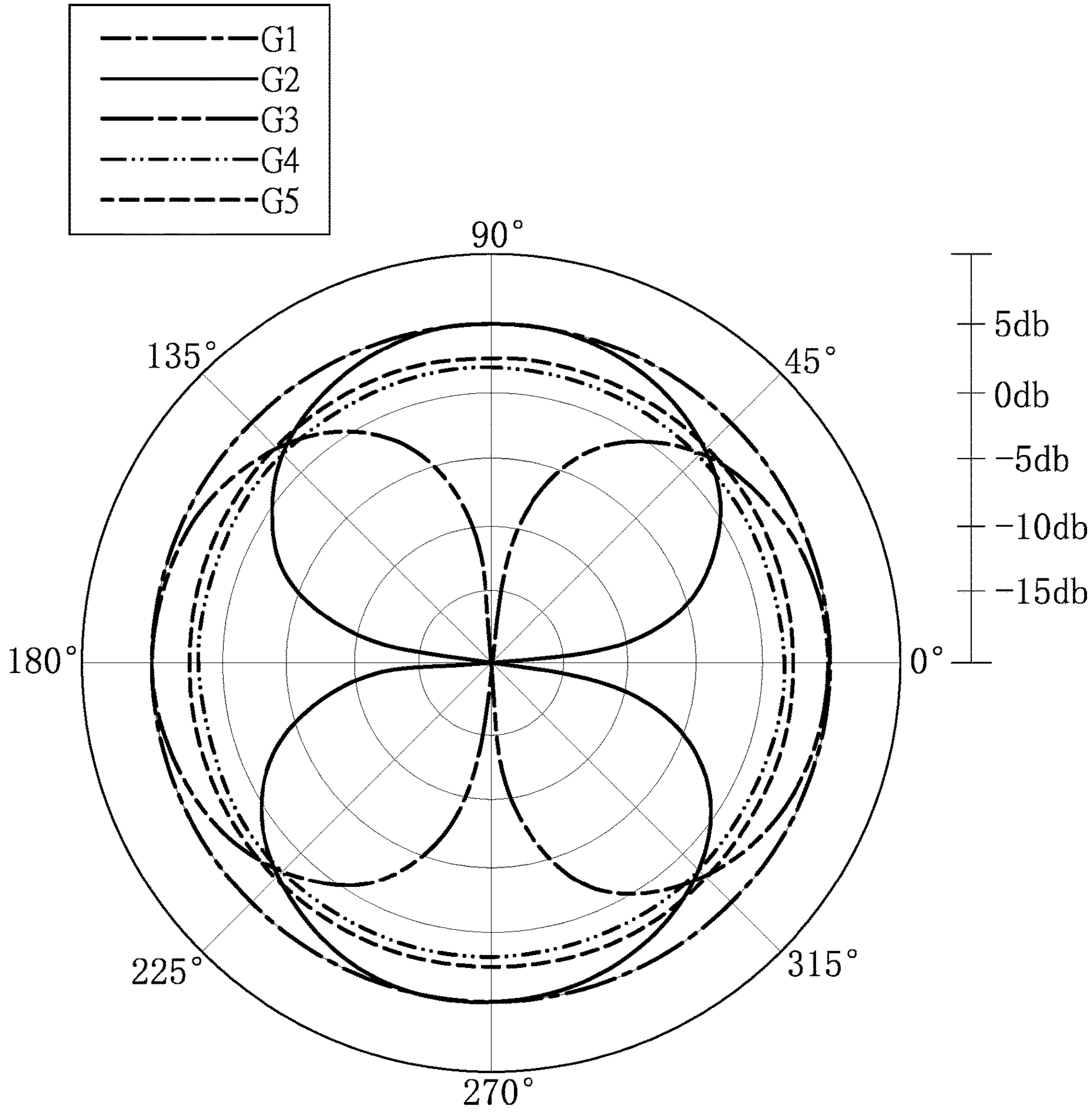
FIG. 8 is a schematic diagram of the radiation pattern of the antenna structure in an E-plane and an H-plane according to the first embodiment of the present disclosure.

Referring to FIG. 7 and FIG. 8, FIG. 7 is a schematic diagram of a radiation pattern of the antenna structure 100A according to the present embodiment, and FIG. 8 is a schematic diagram of the radiation pattern in an E-plane and an H-plane. When a dot density in FIG. 7 is lower, a gain value is higher. The schematic diagram in FIG. 8 has five lines G1 to G5, the line G1 is a total gain value, the line G2 is the gain value in a θ direction, the line G3 is the gain value in a Φ direction, the line G4 is the gain value in a left direction, and the line G5 is the gain value in a right direction. It can be known from FIG. 7 to FIG. 8 that, since the size of the grounding component and the size of the radiating component are similar, a ratio of a front gain value is similar to a ratio of a back gain value.

It should be noted that, in one embodiment (not shown in the figures) of the present disclosure, a position of one of the two grounding elements 5 and a position of one of the two feeding points 4 can be designed on one of two diagonal lines of the second body portion 31, and a position of the other one of the two grounding elements 5 and a position of the other one of the two feeding points 4 can be designed on the other one of the two diagonal lines of the second body portion 31. Accordingly, the antenna structure in this embodiment (not shown in the figures) of the present disclosure can also have a same effect as the antenna structure 100A in the first embodiment.

Second Embodiment

Figure 9:
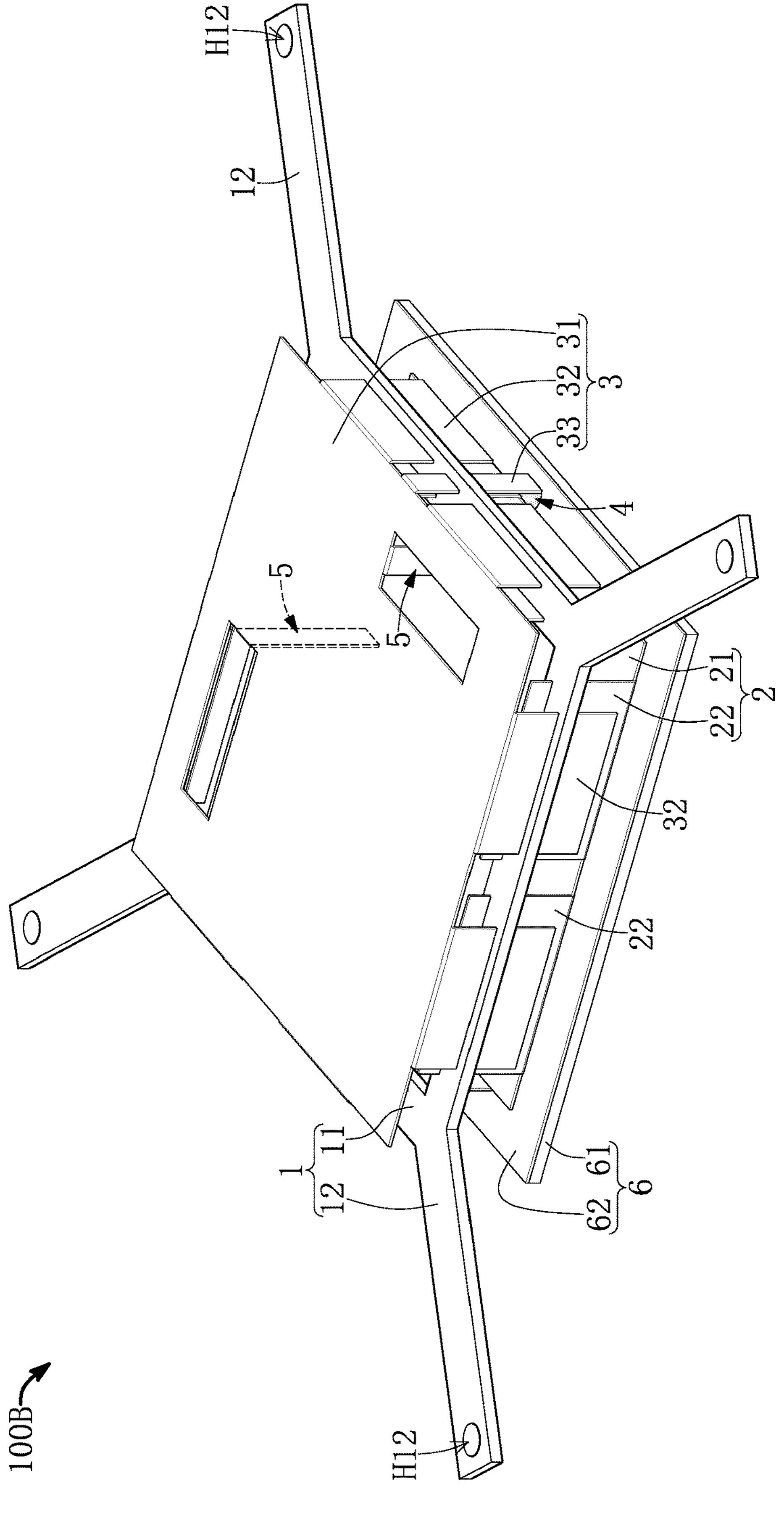
FIG. 9 is a schematic perspective view of the antenna structure according to a second embodiment of the present disclosure.
Figure 10:
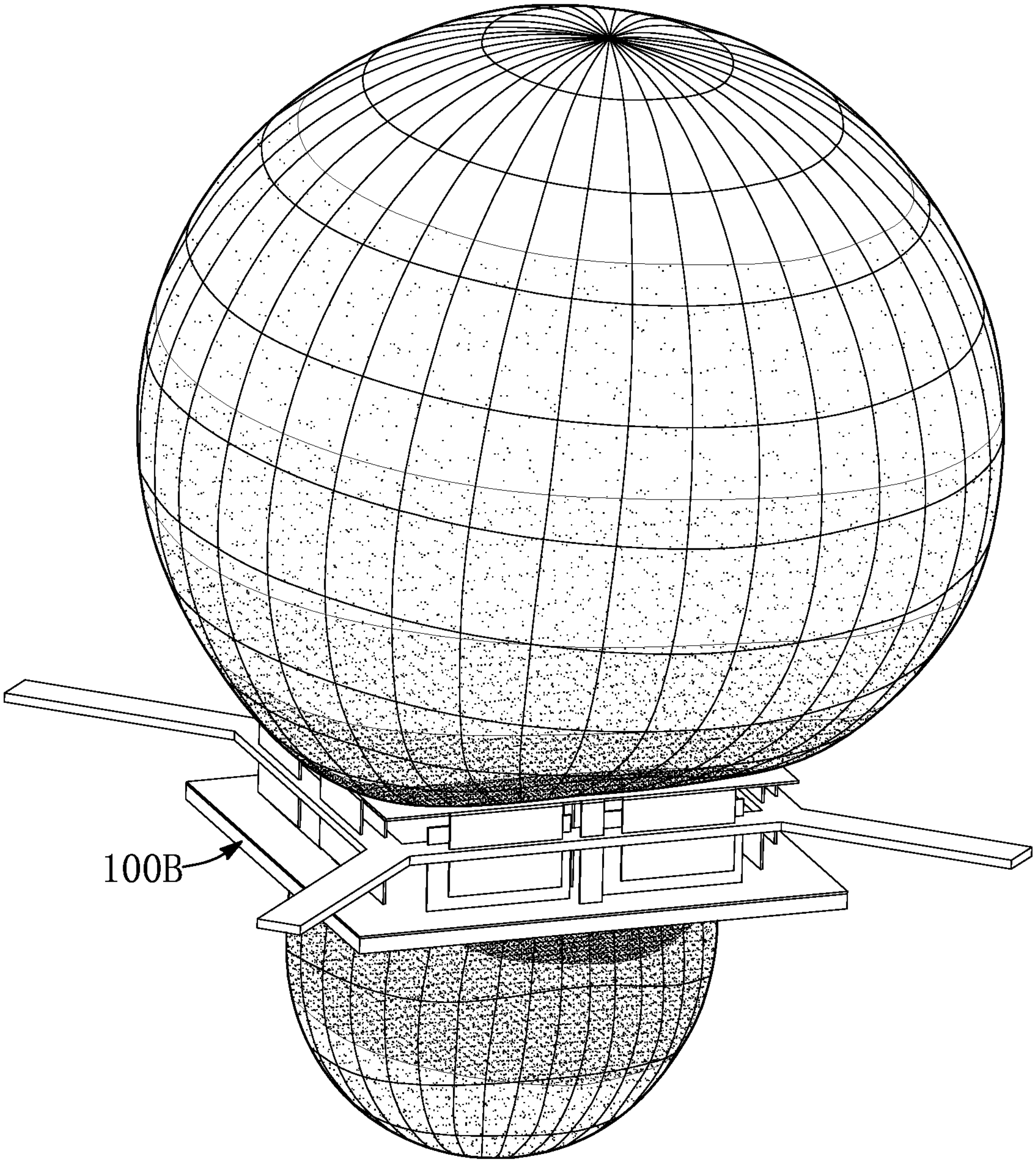
FIG. 10 is a schematic diagram of the radiation pattern of the antenna structure according to the second embodiment of the present disclosure.

Referring to FIG. 9 to FIG. 10, a second embodiment of the present disclosure provides an antenna structure 100B. The antenna structure 100B in the present embodiment is similar to the antenna structure 100A in the first embodiment, and the similarities therebetween will not be repeated herein. The difference between the present embodiment and the first embodiment are as follows.

The antenna structure 100B further includes a reflector 6 disposed on one side of the first antenna 2 away from the second antenna 3, and an area of the reflector 6 is greater than the area of the first body portion 21 and the area of the second body portion 31. Accordingly, the reflector 6 can reflect a radio wave of the first antenna 2 and a radio wave of the second antenna 3.

Referring to FIG. 9, in one embodiment, the reflector 6 may have a bottom plate 61 and a reflective layer 62 disposed on the bottom plate 61. The bottom plate 61 is disposed on the first antenna 2, and the bottom plate 61 is parallel to the first body portion 21. In practice, the reflective layer 62 may be made of a metal material, and is located on a side of the bottom plate 61 facing the second body portion 31.

In another embodiment (not shown in the figures) of the present disclosure, the reflector 6 may be formed by extending the grounding component. For example, the first body portion 21 has a plurality of extending portions that extend from the four side edges thereof, and the extending portions can be parallel to the first body portion 21, so that the extending portions (and the first body portion 21) can jointly form the reflector 6.

Referring to FIG. 10, FIG. 10 is a schematic diagram of a radiation pattern of the antenna structure 100B according to the present embodiment. When a dot density in FIG. 10 is lower, a gain value is higher. It can be known from FIG. 10 that the antenna structure 100B in the present embodiment can have more directivity and a higher gain value than the antenna structure 100A of the first embodiment.

Third Embodiment

Referring to FIG. 11 to FIG. 14, a third embodiment of the present disclosure provides an antenna structure 100C. The antenna structure 100C in the present embodiment is similar to the antenna structure 100A in the first embodiment, and the similarities therebetween will not be repeated herein. The difference between the present embodiment and the first embodiment mainly resides in that a polarization mode of the antenna structure 100C in the present embodiment is circular polarization. In other words, any antenna structure that does not have a polarization mode being circular polarization is not the antenna structure 100C of the present disclosure.

Figure 11:
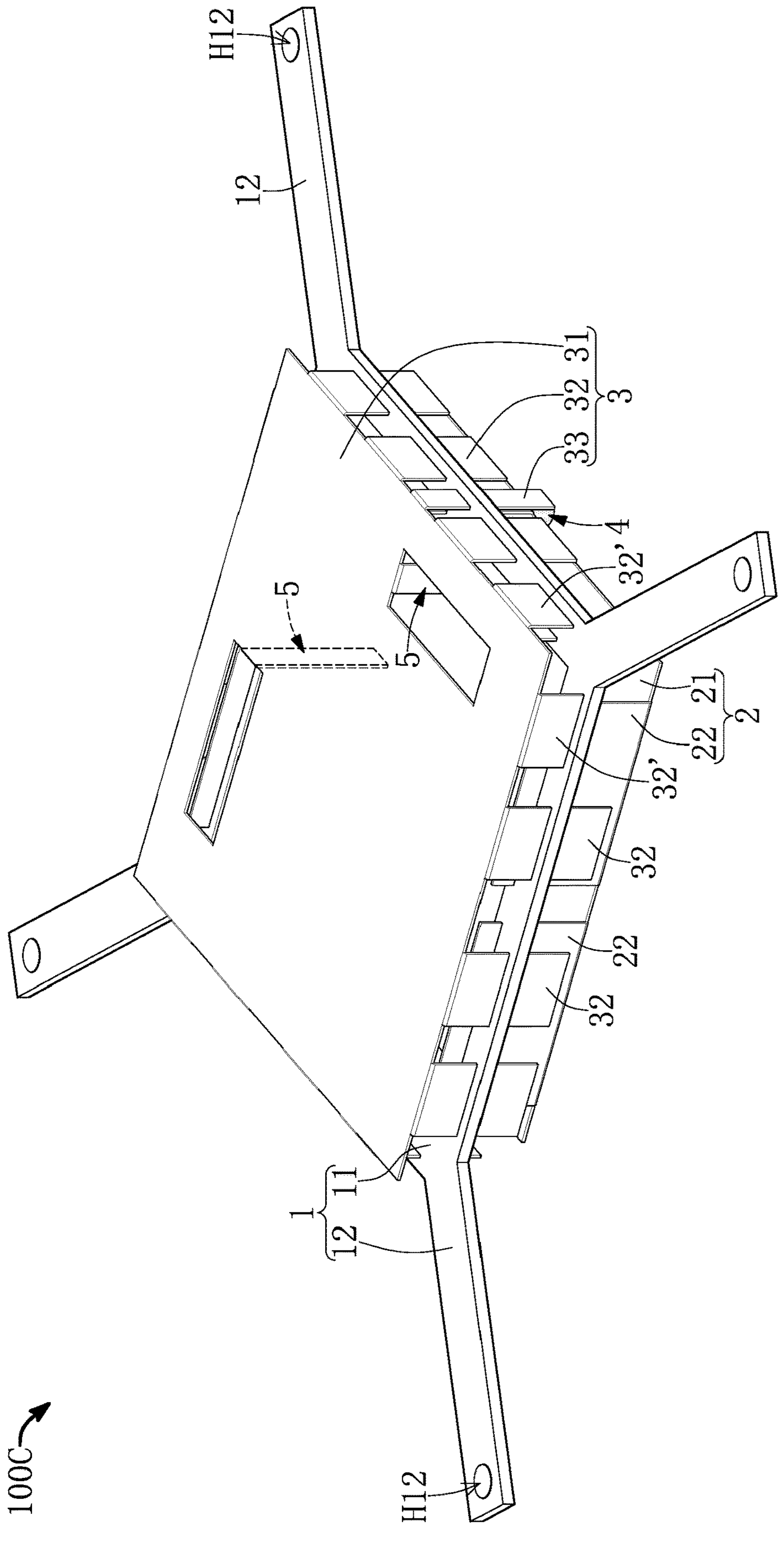
FIG. 11 is a schematic perspective view of the antenna structure according to a third embodiment of the present disclosure.
Figure 12:
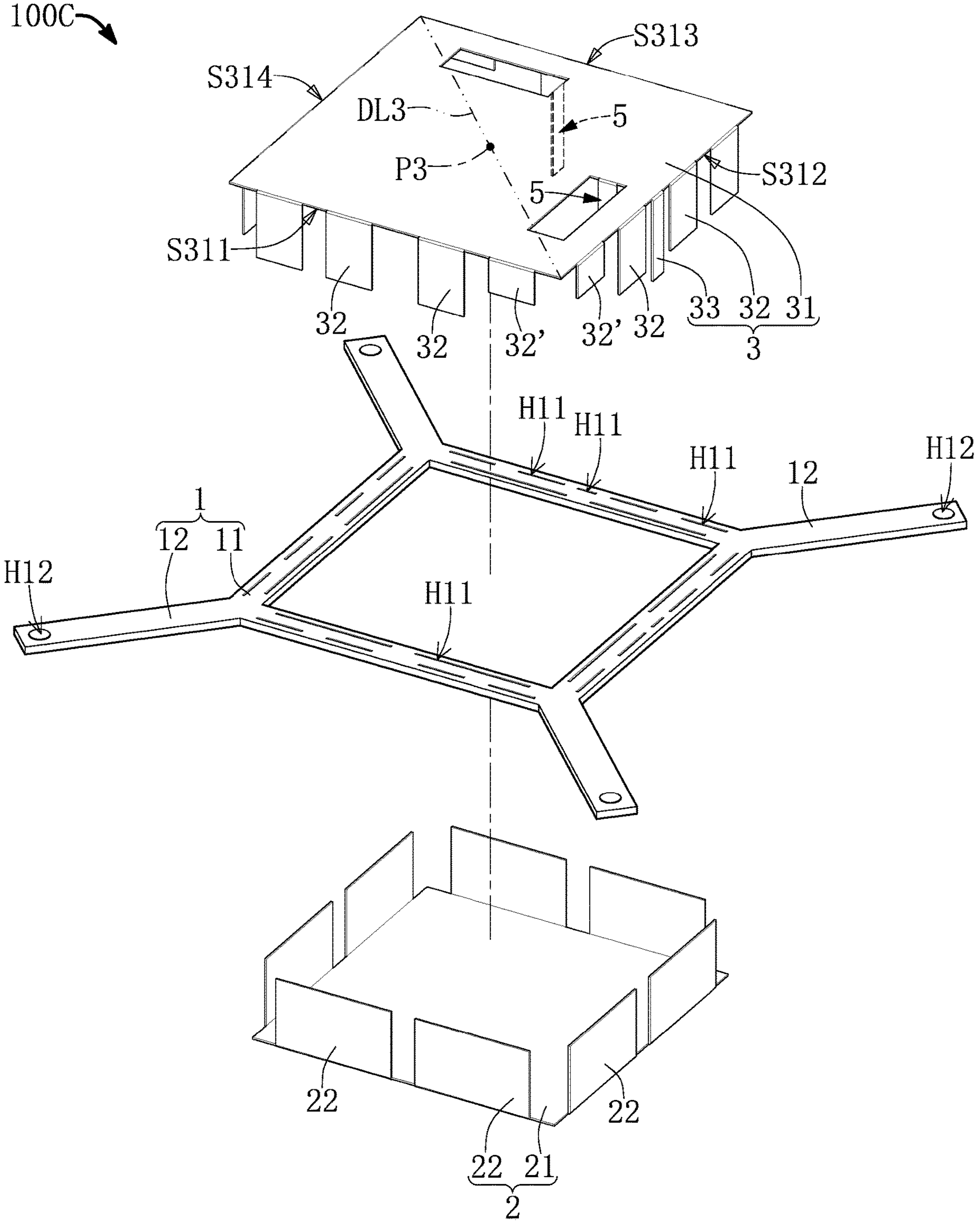
FIG. 12 is an exploded view of the antenna structure according to the third embodiment of the present disclosure.
Figure 13:
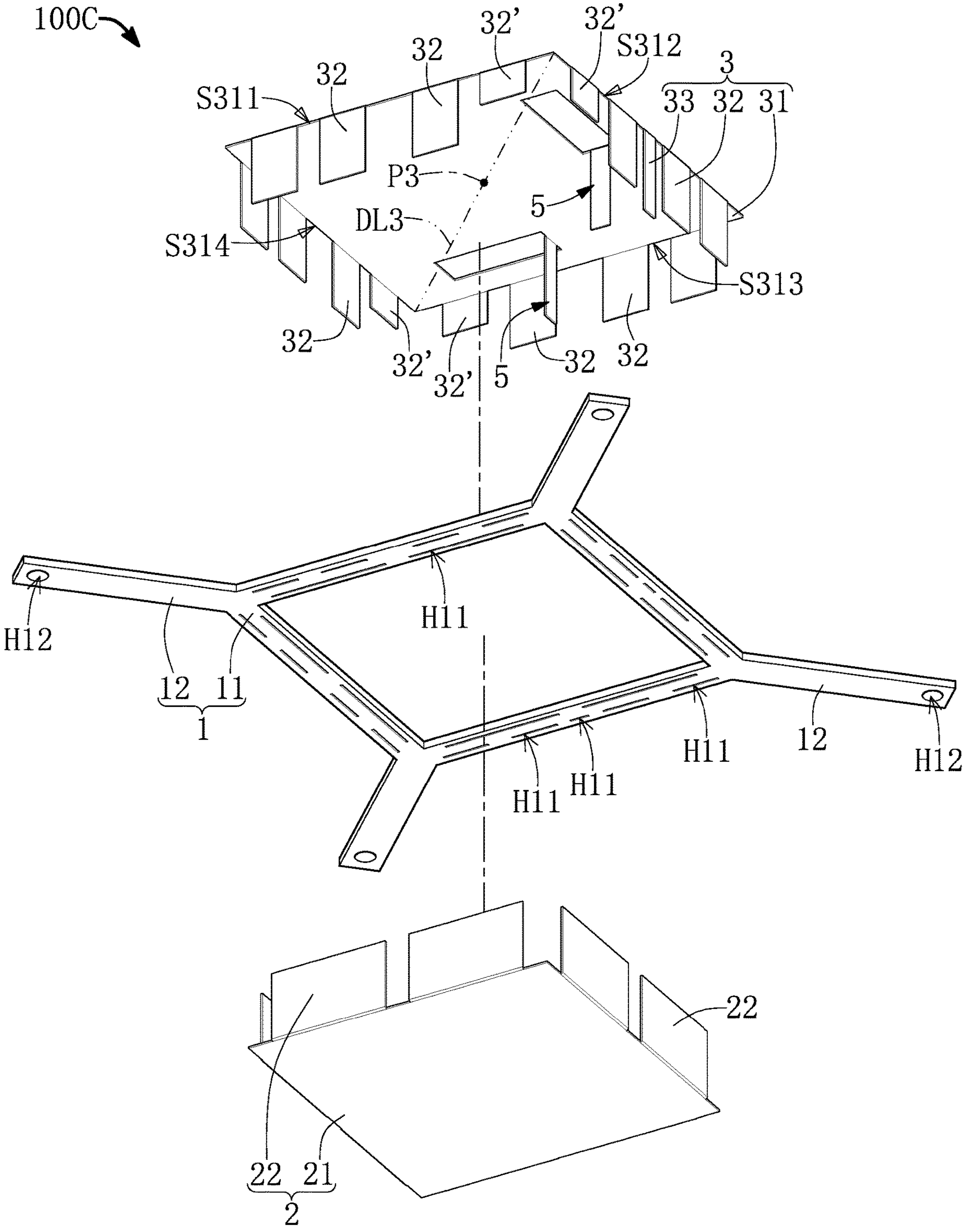
FIG. 13 is another exploded view of the antenna structure according to the third embodiment of the present disclosure.

Specifically, as shown in FIG. 11 to FIG. 13, the second body portion 31 of the second antenna 3 in the present embodiment has a diagonal line DL3 that passes through a junction position of two of the four side edges and a junction position of another two of the four side edges, and the diagonal line DL3 can pass through the center position P3 of the second body portion 31.

In addition, in the present embodiment, each of the four side edges of the second body portion 31 is connected to at least two of the second extending portions. In each of the four side edges of the second body portion 31, a length of a second extending portion 32' adjacent to the diagonal line DL3 is less than a length of any one of the second extending portions 32.

In practical use, a quantity of the second extending portions 32 is inconsistent with a quantity of the first extending portions 22. Further, each of the four side edges of the second body portion 31 may be connected to four of the second extending portions 32, and each of the four side edges of the first body portion 21 may be connected to two of the first extending portions 22. Every two of the second extending portions correspond in position to a position of one of the first extending portions 22.

Further, the four side edges of the second body portion 31 are defined as a first side edge S311, a second side edge S312, a third side edge S313, and a fourth side edge S314. A position of the first side edge S311 and a position of the third side edge S313 are opposite to each other, and a position of the second side edge S312 and a position of the fourth side edge S314 are opposite to each other. The diagonal line DL3 of the second body portion 31 passes through a connection position between the first side edge S311 and the second side edge S312 and a connection position between the third side edge S313 and the fourth side edge S314. Among the second extending portions in the first side edge S311 or the third side edge S313, the length of the second extending portion 32' at a rightmost position is less than the length of any one of the second extending portions 32. Among the second extending portions in the second side edge S312 or the fourth side edge S314, the length of the second extending portion 32' at a leftmost position is less than the length of any one of the second extending portions 32.

Figure 14:
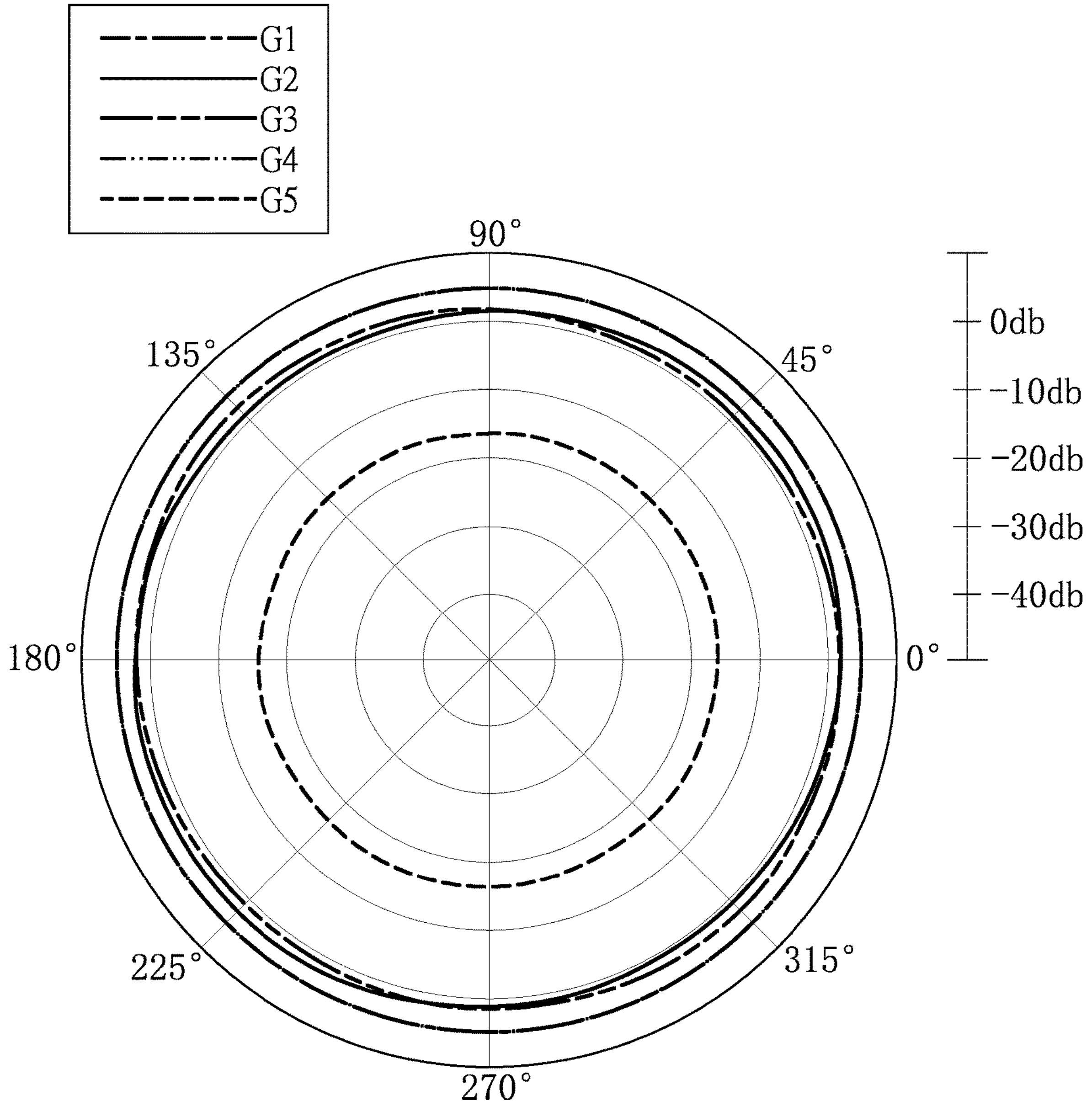
FIG. 14 is a schematic diagram of the radiation pattern of the antenna structure in an E-plane and an H-plane according to the third embodiment of the present disclosure.

Referring to FIG. 14, FIG. 14 is a schematic diagram of the radiation pattern of the antenna structure 100C in an E-plane and an H-plane. The schematic diagram in FIG. 14 has five lines G1 to G5, the line G1 is a total gain value, the line G2 is the gain value in a θ direction, the line G3 is the gain value in a Φ direction, the line G4 is the gain value in a left direction, and the line G5 is the gain value in a right direction.

It can be known from FIG. 14 that a frequency of the first antenna 2 and a frequency of the second antenna 3 are inconsistent by a difference between the length of the second extending portion 32' adjacent to the diagonal line DL3 and the length of any one of the second extending portions 32, so that the radiation pattern of the antenna structure 100C in the present embodiment is circular, that is, circular polarization.

In addition, a quantity of connecting portions 33 of the second body portion 31 in the present embodiment is one (as shown in FIG. 13). The connecting portion 33 is formed by extending from the second body portion 31 toward the first body portion 21, and is perpendicular to the second body portion 31 and passes through the frame body 11, so that the connecting portion 33 can be connected to the first body portion 21 to form a feeding point 4 that passes through one of the two centerlines ML. In other words, a quantity of feeding points of the antenna structure 100C in the present embodiment is one.

Naturally, the antenna structure 100C in the present embodiment can also have the reflector 6 of the second embodiment disposed therein according to practical requirements, and details thereof will not be described herein.

Fourth Embodiment

Figure 15:
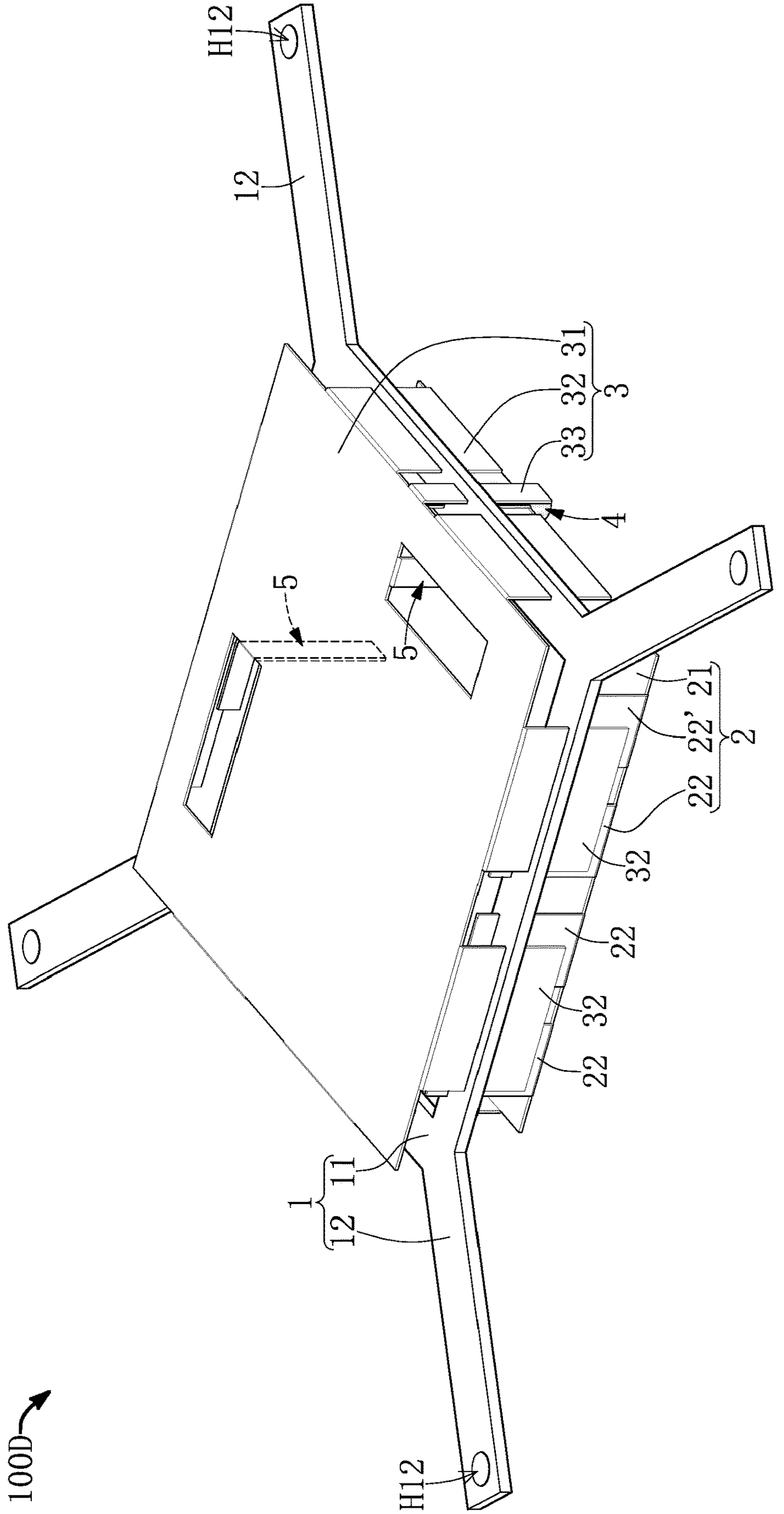
FIG. 15 is a schematic perspective view of the antenna structure according to a fourth embodiment of the present disclosure.
Figure 16:
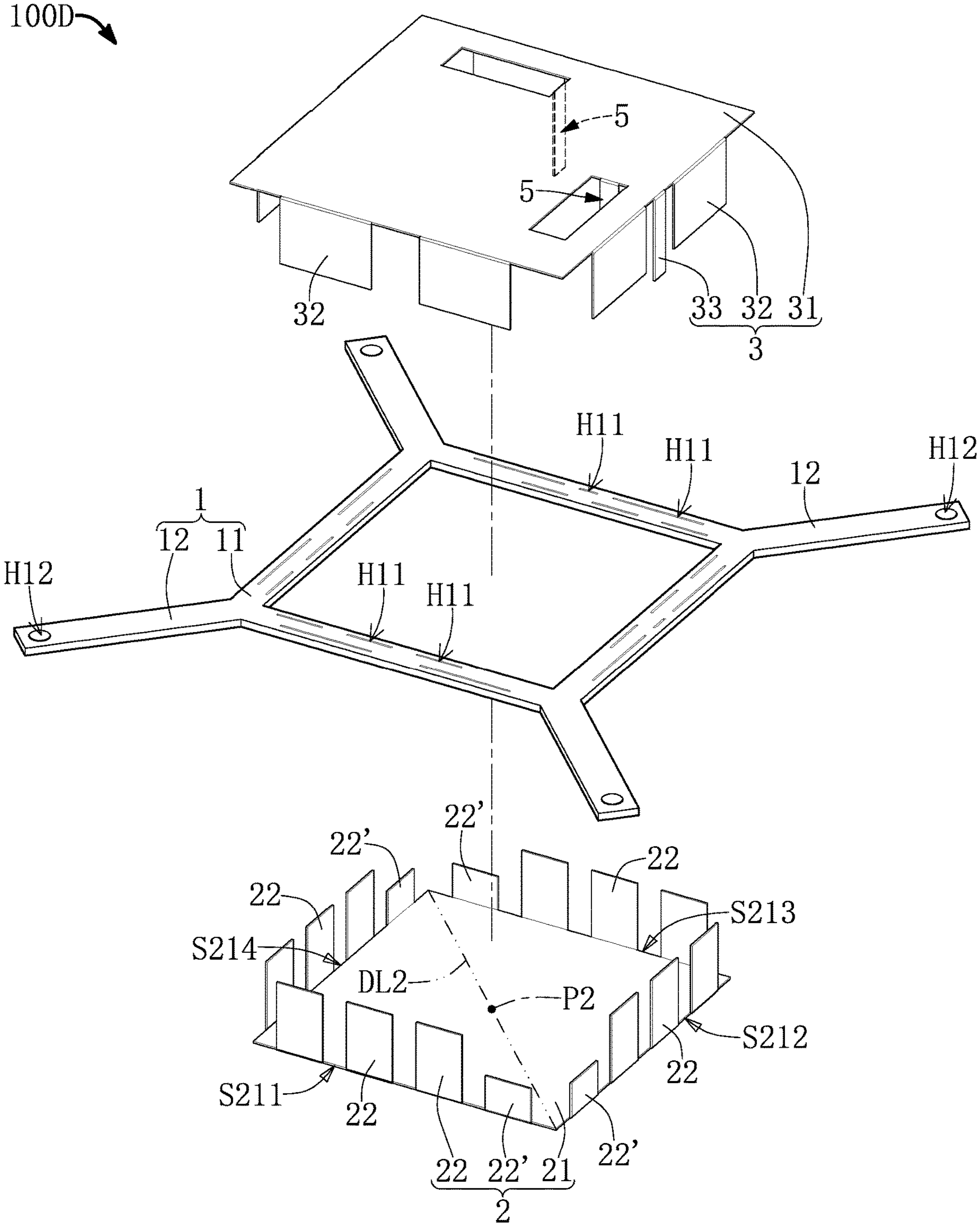
FIG. 16 is an exploded view of the antenna structure according to the fourth embodiment of the present disclosure.
Figure 17:
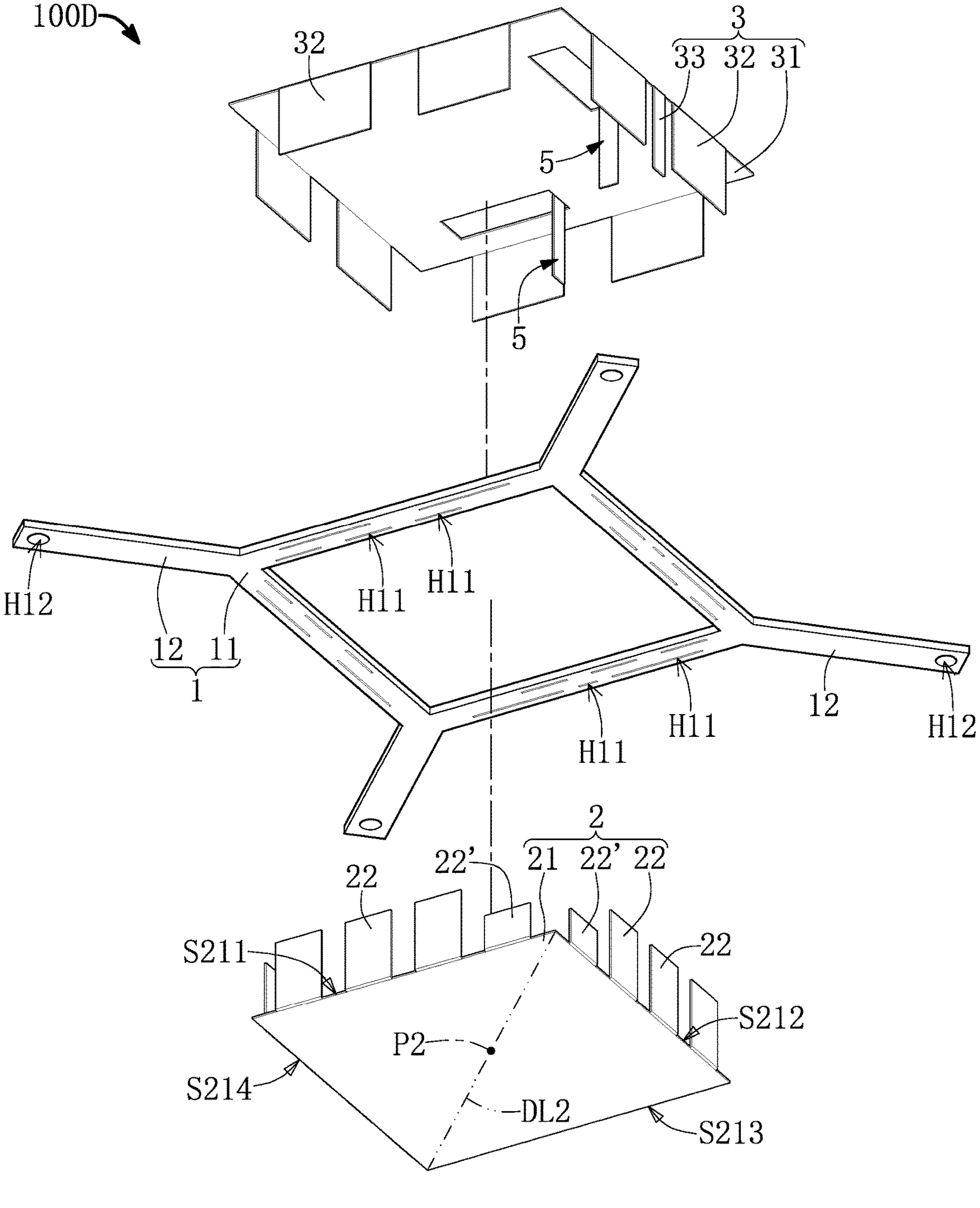
FIG. 17 is another exploded view of the antenna structure according to the fourth embodiment of the present disclosure.
Figure 18:
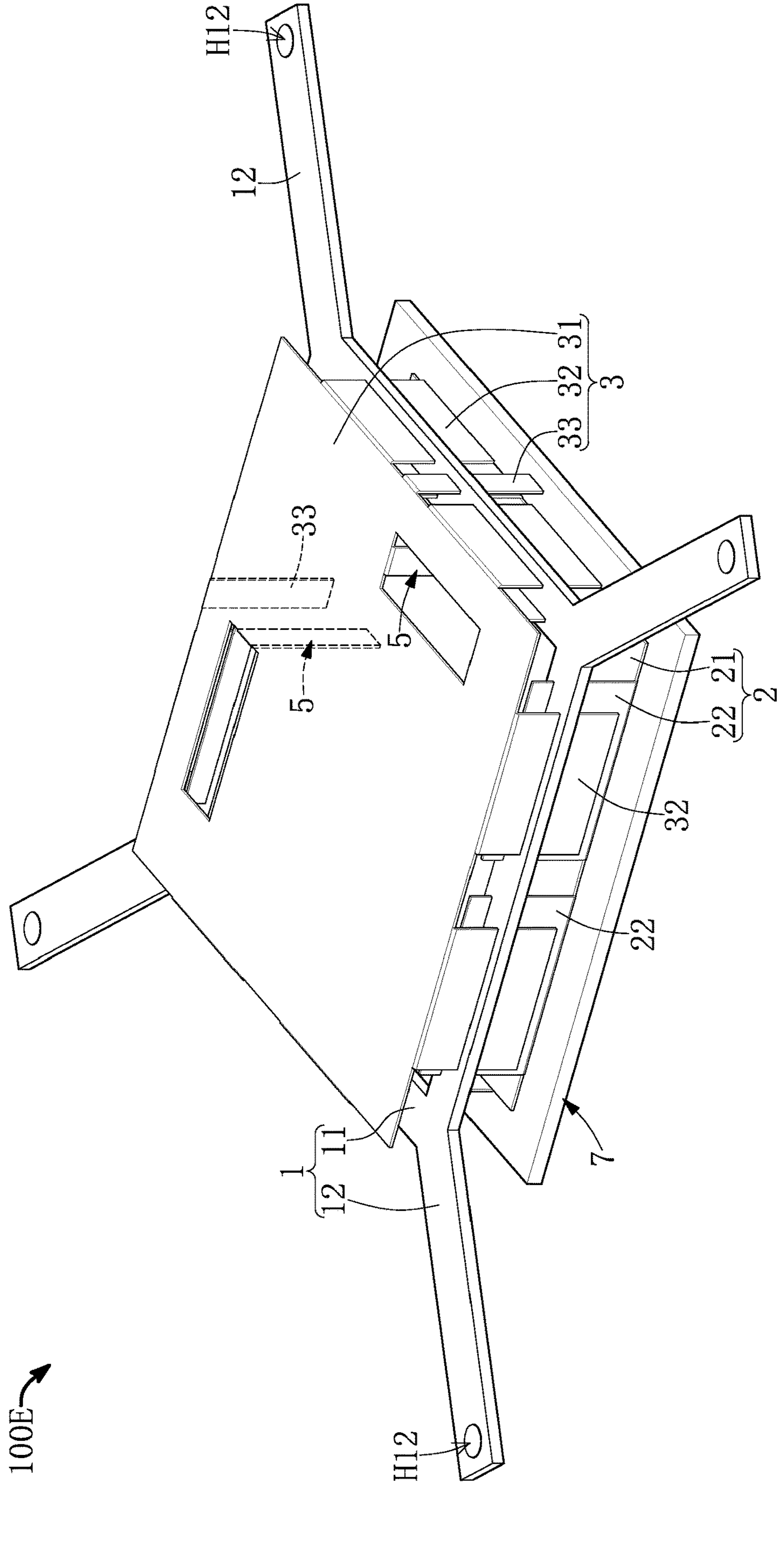
FIG. 18 is a schematic perspective view of the antenna structure according to a fifth embodiment of the present disclosure.

Referring to FIG. 15 to FIG. 17, a fourth embodiment of the present disclosure provides an antenna structure 100D. The antenna structure 100D in the present embodiment is similar to the antenna structure 100A in the first embodiment, and the similarities therebetween will not be repeated herein. The difference between the present embodiment and the first embodiment mainly resides in that a polarization mode of the antenna structure 100D in the present embodiment is circular polarization. In other words, any antenna structure that does not have a polarization mode being circular polarization is not the antenna structure 100D of the present disclosure.

Specifically, the first body portion 21 of the first antenna 2 in the present embodiment has a diagonal line DL2, and the diagonal line DL2 passes through a connection position between two of the four side edges and a connection position between another two of the four side edges. The diagonal line DL2 can pass through a central position P2 of the first body portion 21.

In addition, each of the four side edges of the first body portion 21 in the present embodiment is connected to at least two of the first extending portions. In each of the four side edges of the first body portion 21, a length of a first extending portion 22' adjacent to the diagonal line DL2 is less than a length of any one of the first extending portions 22.

In practical use, a quantity of the first extending portions is inconsistent with a quantity of the second extending portions 32. Further, each of the four side edges of the first body portion 21 may be connected to four of the first extending portions 32, and each of the four side edges of the second body portion 31 may be connected to two of the second extending portions 32. Every two of the first extending portions correspond in position to a position of one of the second extending portions 32.

Further, the four side edges of the first body portion 21 are defined as a first side edge S211, a second side edge S212, a third side edge S213, and a fourth side edge S214. A position of the first side edge S211 and a position of the third side edge S213 are opposite to each other, and a position of the second side edge S212 and a position of the fourth side edge S214 are opposite to each other. The diagonal line DL2 of the first body portion 21 passes through a connection position between the first side edge S211 and the second side edge S212 and a connection position between the third side edge S213 and the fourth side edge S214. Among the first extending portions in the first side edge S211 or the third side edge S213, the length of the first extending portion 22' at a rightmost position is less than the length of any one of the first extending portions 22. Among the first extending portions in the second side edge S212 or the fourth side edge S214, the length of the first extending portion 22' at a leftmost position is less than the length of other of the first extending portions 22.

It should be noted that, the antenna structure 100D in the present embodiment applies technical features of the second antenna in the third embodiment to the first antenna of the present embodiment. Therefore, the radiation pattern in an E-plane and an H-plane that is generated by the antenna structure 100D is substantially the same as the radiation pattern of the third embodiment (as shown in FIG. 14). In other words, a frequency of the first antenna 2 and a frequency of the second antenna 3 are inconsistent by a difference between the length of the first extending portion 22' adjacent to the diagonal line DL2 and the lengths of any one of the first extending portions 22, so that the radiation pattern of the antenna structure 100D in the present embodiment is circular, that is, circular polarization.

In addition, a quantity of connecting portions of the second body portion 31 in the present embodiment is one. The connecting portion 33 is formed by extending from the second body portion 31 toward the first body portion 21, and is perpendicular to the second body portion 31 and passes through the frame body 11, so that the connecting portion 33 can be connected to the first body portion 21 to form a feeding point 4 that passes through one of the two center-lines ML. In other words, a quantity of feeding points of the antenna structure 100D in the present embodiment is one.

Naturally, the antenna structure 100D in the present embodiment can also have the reflector 6 of the second embodiment disposed therein according to practical requirements, and details thereof will not be described herein.

Fifth Embodiment

Figure 19:
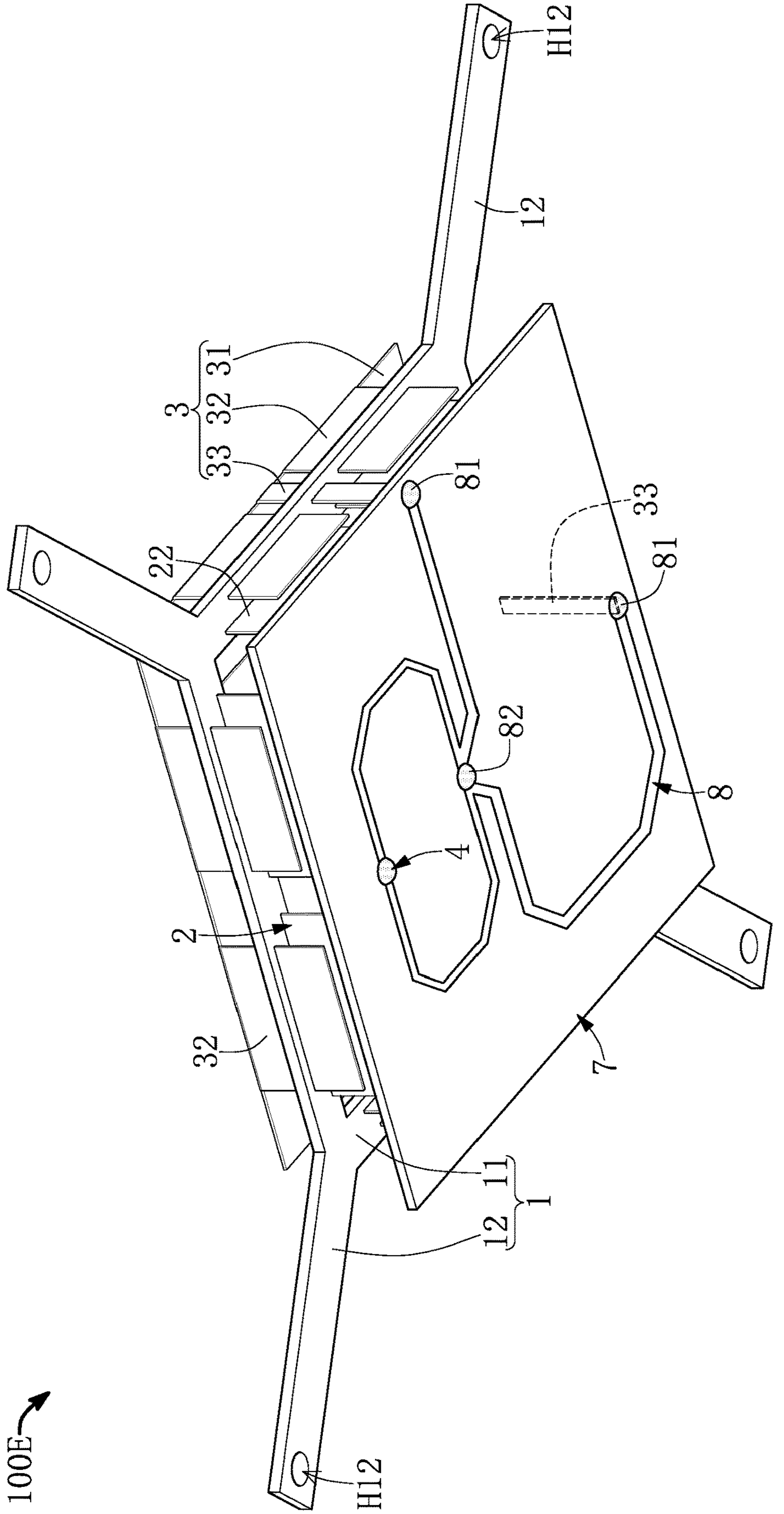
FIG. 19 is another schematic perspective view of the antenna structure according to the fifth embodiment of the present disclosure.
Figure 20:
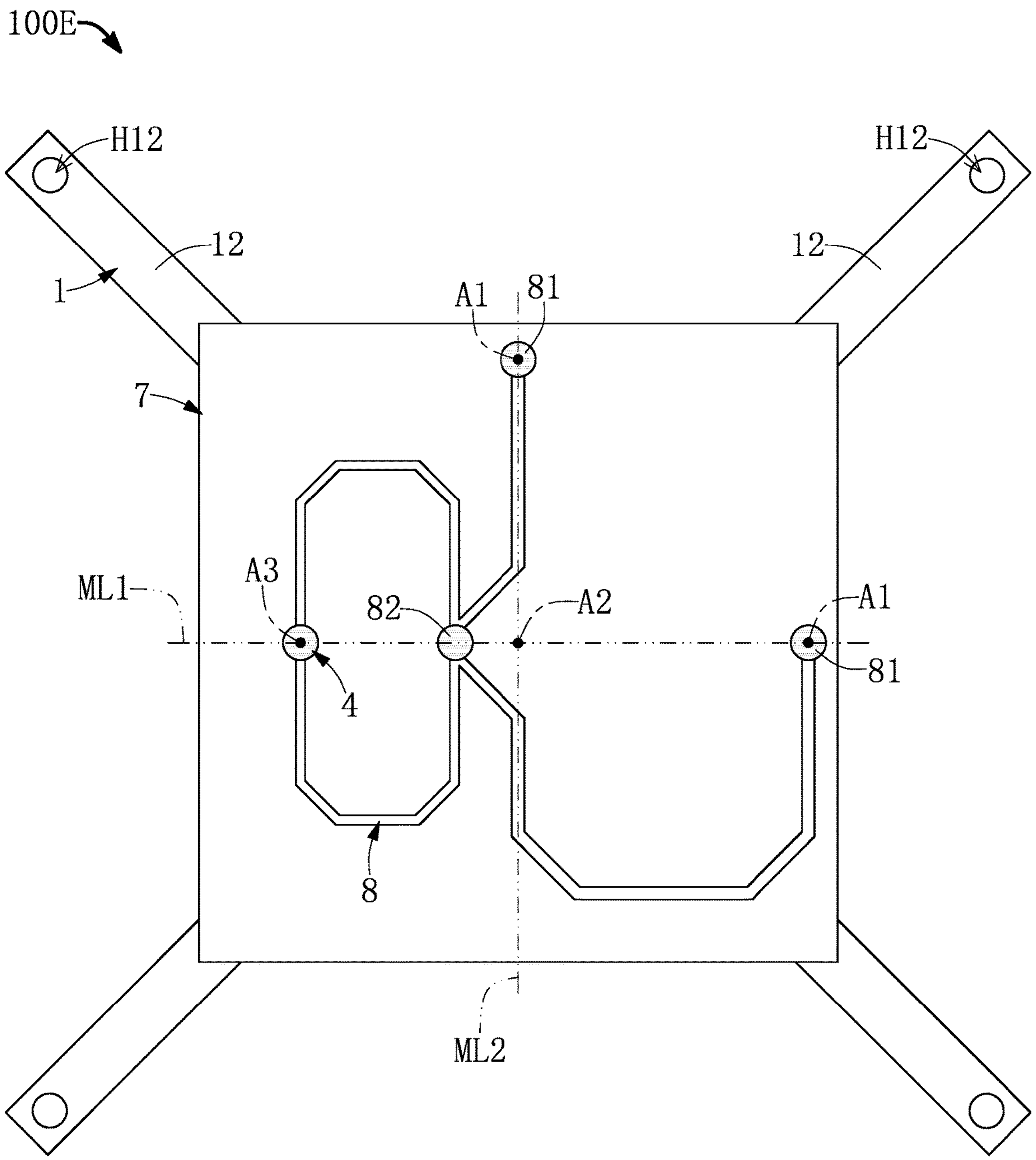
FIG. 20 is a schematic bottom view of the antenna structure according to the fifth embodiment of the present disclosure.
Figure 21:
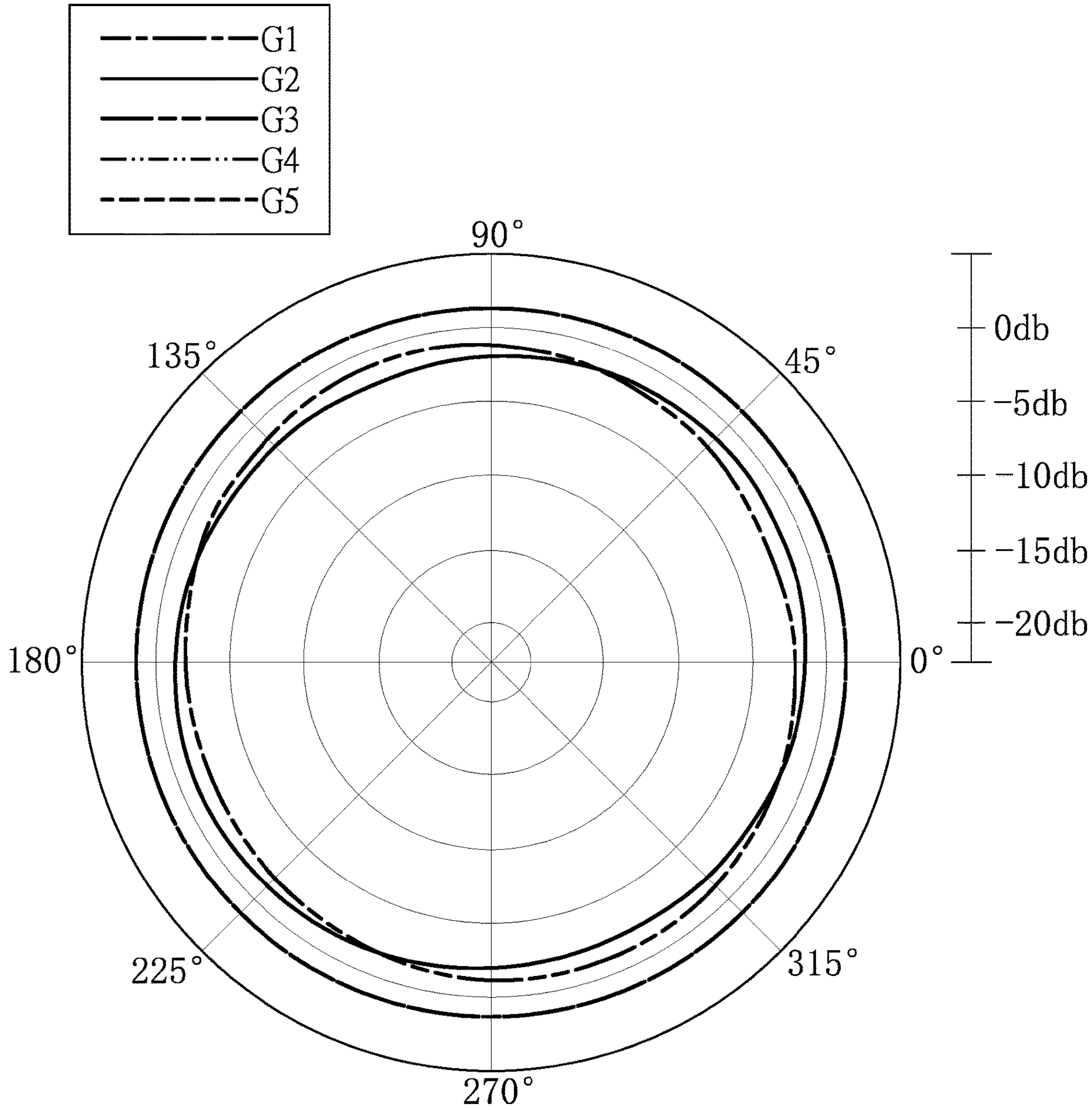
FIG. 21 is a schematic diagram of the radiation pattern of the antenna structure in an E-plane and an H-plane according to the fifth embodiment of the present disclosure.

Referring to FIG. 19 to FIG. 21, a fifth embodiment of the present disclosure provides an antenna structure 100E. The antenna structure 100E in the present embodiment is similar to the antenna structure 100A in the first embodiment, and the similarities therebetween will not be repeated herein. The difference between the present embodiment and the first embodiment mainly resides in that a polarization mode of the antenna structure 100E in the present embodiment is circular polarization. In other words, any antenna structure that does not have a polarization mode being circular polarization is not the antenna structure 100E of the present disclosure.

Specifically, as shown in FIG. 19 and FIG. 20, the antenna structure 100E in the present embodiment further includes an insulating plate 7 and a microstrip line 8. The insulating plate 7 is disposed on the first antenna 2, and the insulating plate 7 may be parallel to the first body portion 21.

The microstrip line 8 is disposed on a side of the insulating plate 7 away from the first body portion 21, and the microstrip line 8 has two contact points 81 and an impedance conversion point 82. The two contact points 81 are electrically coupled to the first antenna 2 and the second antenna 3, and a phase difference between the two contact points 81 is 90 degrees. The impedance conversion point 82 is electrically coupled to the two contact points 81.

In detail, a region defined by orthogonally projecting two portions of the microstrip line 8 on the insulating plate 7 is overlapped with a region defined by orthogonally projecting the two connecting portions 33 of the second antenna 3 on the insulating plate 7. The two portions of the microstrip line 8 pass through the insulating plate 7 and are electrically coupled to the two connecting portions 33, respectively, so that each of the two contact points 81 is formed at an electrical coupling position between each of the two portions of the microstrip line 8 and each of the two connecting portions 33 (In other words, the two connecting portions 33 are respectively located on two adjacent ones of the four side edges of the second body portion 31, and the two connecting portions 33 are connected to the first antenna 2 and the microstrip line 8 to form the two contact points 81).

In addition, as shown in FIG. 20, two first projection points A1 are respectively defined by orthogonally projecting the two contact points 81 on the insulating plate 7, and a second projection point A2 is defined by orthogonally projecting the center position P3 of the second body portion 31 on the insulating plate 7. A first imaginary line ML1 passing through the second projection point A2 and one of the two first projection points A1 is perpendicular to a second imaginary line ML2 passing through the second projection point A2 and the other one of the two first projection points A1.

In addition, a position defined by orthogonally projecting the impedance conversion point 82 on the second body portion 31 is adjacent to the second projection point A2, and the impedance conversion point 82 can be used to perform impedance transformation on the first antenna 2 and the second antenna 3.

Furthermore, in the present embodiment, the antenna structure 100E has a feeding point 4 electrically coupled to the microstrip line 8, and a projection point A3 defined by orthogonally projecting the feeding point 4 on the insulating plate 7 is located on the first imaginary line ML1. In addition, two positions defined by orthogonally projecting the two grounding elements 5 on the insulating plate 7 are located on the first imaginary line ML1 and the second imaginary line ML2, respectively.

Referring to FIG. 21, FIG. 21 is a schematic diagram of a radiation pattern of the antenna structure 100E in an E-plane and an H-plane. The schematic diagram in FIG. 21 has five lines G1 to G5, the line G1 is a total gain value, the line G2 is the gain value in a θ direction, the line G3 is the gain value in a Φ direction, the line G4 is the gain value in a left direction, and the line G5 is the gain value in a right direction. It can be known from FIG. 21 that a frequency of the first antenna 2 and a frequency of the second antenna 3 are inconsistent by a phase difference between the two contact points being 90 degrees, so that the radiation pattern of the antenna structure 100E in the present embodiment is circular, that is, circular polarization.

Beneficial Effects of the Embodiments

In conclusion, in the antenna structure provided by the present disclosure, by virtue of each of the plurality of second extending portions being non-parallel to the second body portion and the second extending portions and the first extending portions being spaced apart from each other by a predetermined distance, so that the second extending portions and the first extending portions are configured to jointly generate a capacitance effect, the antenna structure can have a three-dimensional structure, and an area occupied by the antenna structure can be more effectively decreased than an area occupied by one having a planar structure and having a same gain.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:

an insulating seat;

a first antenna disposed on the insulating seat, and the first antenna including:

a first body portion having four side edges; and a plurality of first extending portions connected to the four side edges of the first body portion, wherein each of the plurality of first extending portions is non-parallel to the first body portion;

a second antenna disposed on the insulating seat, and the second antenna including:

a second body portion spaced apart from the first body portion and having four side edges, wherein the second body portion has four side edges and a diagonal line, and the diagonal line passes through a junction position of two of the four side edges and a junction position of another two of the four side edges; and a plurality of second extending portions non-parallel to the second body portion, wherein each of the four side edges of the second body portion is connected to at least two of the second extending portions, and wherein the second extending portions and the first extending portions are spaced apart from each other by a predetermined distance, so that the second extending portions and the first extending portions are configured to jointly generate a capacitance effect;

wherein, in each of the four side edges of the second body portion, a length of a second extending portion adjacent to the diagonal line is less than a length of any one of the second extending portions; and two feeding points electrically coupled to the first antenna and the second antenna.

2. The antenna structure according to claim 1, further comprising a reflector disposed on one side of the first antenna away from the second antenna, wherein an area of the reflector is greater than an area of the first antenna and an area of the second antenna.

3. The antenna structure according to claim 1, wherein the first body portion and the second body portion are each in a square shape, and a difference between an area of the first body portion and an area of the second body portion is less than or equal to 5% of the area of the first body portion; wherein the first extending portions extend from the first body portion toward the second body portion and the second extending portions extend from the second body portion toward the first body portion; wherein the first body portion and the first extending portions are perpendicular to each other, the second body portion and the second extending portions are perpendicular to each other, and the first body portion and the second body portion are parallel to each other.

4. The antenna structure according to claim 1, wherein a quantity of the first extending portions connected to each of the four side edges of the first body portion is not equal to a quantity of the second extending portions connected to each of the four side edges of the second body portion.

5. The antenna structure according to claim 1, wherein an area of each of the plurality of first extending portions is less than or equal to 30% of an area of the first body portion, and an area of each of the plurality of second extending portions is less than or equal to 30% of an area of the second body portion.

6. An antenna structure, comprising:

an insulating seat;

a first antenna disposed on the insulating seat, and the first antenna including:

a first body portion having four side edges; and a plurality of first extending portions connected to the four side edges of the first body portion, wherein each of the plurality of first extending portions is non-parallel to the first body portion;

a second antenna disposed on the insulating seat, and the second antenna including:

a second body portion spaced apart from the first body portion and having four side edges; and a plurality of second extending portions connected to the four side edges of the second body portion and non-parallel to the second body portion, wherein the second extending portions and the first extending portions are spaced apart from each other by a predetermined distance, so that the second extending portions and the first extending portions are configured to jointly generate a capacitance effect;

an insulating plate disposed on the first antenna;

a microstrip line disposed on the insulating plate, wherein the microstrip line has two contact points electrically coupled to the first antenna and the second antenna, and a phase difference between the two contact points is 90 degrees; and two feeding points electrically coupled to the microstrip line;

wherein the second antenna further includes two connecting portions formed by extending from the second body portion toward the first body portion; wherein the two connecting portions are respectively located on two adjacent ones of the four side edges of the second body portion, and the two connecting portions are connected to the first antenna and the microstrip line to form the two contact points.

7. The antenna structure according to claim 6, further comprising a reflector disposed on one side of the first antenna away from the second antenna, wherein an area of the reflector is greater than an area of the first antenna and an area of the second antenna.

8. The antenna structure according to claim 6, wherein two first projection points are respectively defined by orthogonally projecting the two contact points on the insulating plate, and a second projection point is defined by orthogonally projecting a center position of the second body portion on the insulating plate; wherein a first imaginary line passing through the second projection point and one of the two first projection points is perpendicular to a second imaginary line passing through the second projection point and the other one of the two first projection points.

9. The antenna structure according to claim 8, further comprising two grounding elements electrically coupled to the first body portion and the second body portion; wherein two positions defined by orthogonally projecting the two grounding elements on the insulating plate are located on the first imaginary line and the second imaginary line, respectively; wherein a projection point defined by orthogonally projecting the feeding point on the insulating plate is located on the first imaginary line.

* * * * *